(12) United States Patent
Maekawa et al.

(10) Patent No.: US 11,308,520 B2
(45) Date of Patent: Apr. 19, 2022

(54) VEHICLE ADVERTISEMENT DISPLAY SYSTEM

(71) Applicant: TOYOTA BOSHOKU KABUSHIKI KAISHA, Aichi (JP)

(72) Inventors: Motoki Maekawa, Aichi (JP); Mitsutaka Sako, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 0 days.

(21) Appl. No.: 16/892,781

(22) Filed: Jun. 4, 2020

(65) Prior Publication Data

US 2020/0394684 A1 Dec. 17, 2020

(30) Foreign Application Priority Data

Jun. 11, 2019 (JP) .............................. JP2019-108569
Jun. 11, 2019 (JP) .............................. JP2019-108571

(51) Int. Cl.
*G06Q 30/00* (2012.01)
*G06Q 30/02* (2012.01)

(52) U.S. Cl.
CPC ..... *G06Q 30/0266* (2013.01); *G06Q 30/0252* (2013.01); *G06Q 30/0255* (2013.01)

(58) Field of Classification Search
CPC ........... G06Q 30/0266; G06Q 30/0252; G06Q 30/0255
See application file for complete search history.

(56) References Cited

U.S. PATENT DOCUMENTS

| 6,580,472 B1 * | 6/2003 | Willingham | B60J 3/04 |
| | | | 359/275 |
| 6,898,517 B1 * | 5/2005 | Froeberg | G01C 21/26 |
| | | | 340/691.6 |
| 10,243,381 B2 * | 3/2019 | Newman | B60Q 1/268 |
| 10,323,455 B2 * | 6/2019 | Campagnolo | E06B 9/24 |
| 2008/0231934 A1 * | 9/2008 | Knafou | B32B 17/10532 |
| | | | 359/245 |

(Continued)

FOREIGN PATENT DOCUMENTS

| DE | 102019219272 A1 * | 6/2021 | |
| EP | 2977291 A1 * | 1/2016 | .......... B61L 15/0045 |

(Continued)

OTHER PUBLICATIONS $22.7 Bn Automotive Glass Market Outlook 2025, M2 Presswire, Apr. 1, 2020 (Year: 2020).*

(Continued)

*Primary Examiner* — Matthew L Hamilton
(74) *Attorney, Agent, or Firm* — Greenblum & Bernstein, P.L.C.

(57) ABSTRACT

A vehicle advertisement display system to be mounted on a vehicle includes a display unit, a detection unit, and a control unit. The display unit performs display at least toward an interior of the vehicle. The detection unit detects at least one of a state of an occupant riding the vehicle or a motion of the occupant as a target. The control unit causes the display unit to display the advertisement image having an advertising content corresponding to the target detected by the detection unit based on correspondence information that defines the advertising content corresponding to each candidate of the target.

7 Claims, 27 Drawing Sheets

(56) References Cited

U.S. PATENT DOCUMENTS

| | | | | |
|---|---|---|---|---|
| 2010/0036717 | A1* | 2/2010 | Trest | G06Q 30/0251 |
| | | | | 705/14.1 |
| 2010/0151228 | A1* | 6/2010 | Chin | B32B 27/08 |
| | | | | 428/323 |
| 2010/0259058 | A1* | 10/2010 | Knighton | B60P 3/14 |
| | | | | 296/24.39 |
| 2012/0310713 | A1* | 12/2012 | Mercuri | G06Q 30/0207 |
| | | | | 705/14.1 |
| 2015/0164400 | A1 | 6/2015 | Shimizu et al. | |
| 2018/0079284 | A1* | 3/2018 | Choi | E05F 15/75 |
| 2018/0141414 | A1* | 5/2018 | Lota | B60N 2/002 |
| 2018/0257755 | A1* | 9/2018 | Avila | G02F 1/15 |
| 2019/0263231 | A1* | 8/2019 | Jabour | G02F 1/163 |
| 2019/0346701 | A1* | 11/2019 | Lam | G06V 20/597 |
| 2020/0031368 | A1* | 1/2020 | Hadano | B60W 50/087 |
| 2021/0107339 | A1* | 4/2021 | Maekawa | G02F 1/163 |
| 2021/0233115 | A1* | 7/2021 | Kardesler | G06Q 30/02 |

FOREIGN PATENT DOCUMENTS

| | | | |
|---|---|---|---|
| GB | 2582138 A * | 9/2020 | B60R 21/026 |
| JP | 11-237854 | 8/1999 | |
| JP | 2001-246988 | 9/2001 | |
| JP | 2008-246013 | 10/2008 | |
| JP | 2011-22211 | 2/2011 | |
| JP | 2011-39601 | 2/2011 | |
| JP | 2011-48531 | 3/2011 | |
| JP | 2014-8070 | 1/2014 | |
| JP | 2018-41238 | 3/2018 | |
| JP | 2018-205794 | 12/2018 | |
| JP | 2019-64407 | 4/2019 | |
| JP | 2019-68933 | 5/2019 | |
| WO | 2014/002418 | 1/2014 | |
| WO | 2014/017090 | 1/2014 | |

OTHER PUBLICATIONS

Smart Glass Market by Technology-Global Forecast 2014-2020, PR Newswire Aug. 4, 2014 (Year: 2014).*

Global Markets and Technologies for Smart Glass, PR Newswire May 30, 2012 (Year: 2012).*

* cited by examiner

Fig. 7

| | | |
|---|---|---|
| STATE OF LARGE FATIGUE | ADVERTISEMENT IMAGE J1 | POSITION INFORMATION J1 |
| | ADVERTISEMENT IMAGE J2 | POSITION INFORMATION J2 |
| | ADVERTISEMENT IMAGE J3 | POSITION INFORMATION J3 |
| | ⋮ | ⋮ |
| STATE OF LARGE SLEEPINESS | ADVERTISEMENT IMAGE K1 | POSITION INFORMATION K1 |
| | ADVERTISEMENT IMAGE K2 | POSITION INFORMATION K2 |
| | ADVERTISEMENT IMAGE K3 | POSITION INFORMATION K3 |
| | ⋮ | ⋮ |
| STATE OF LARGE STRESS | ADVERTISEMENT IMAGE L1 | POSITION INFORMATION L1 |
| | ADVERTISEMENT IMAGE L2 | POSITION INFORMATION L2 |
| | ADVERTISEMENT IMAGE L3 | POSITION INFORMATION L3 |
| | ⋮ | ⋮ |
| STATE OF LONG SEATED TIME | ADVERTISEMENT IMAGE M1 | POSITION INFORMATION M1 |
| | ADVERTISEMENT IMAGE M2 | POSITION INFORMATION M2 |
| | ADVERTISEMENT IMAGE M3 | POSITION INFORMATION M3 |
| | ⋮ | ⋮ |
| STATE OF HIGH BLOOD PRESSURE | ADVERTISEMENT IMAGE N1 | POSITION INFORMATION N1 |
| | ADVERTISEMENT IMAGE N2 | POSITION INFORMATION N2 |
| | ADVERTISEMENT IMAGE N3 | POSITION INFORMATION N3 |
| | ⋮ | ⋮ |
| STATE OF SMALL PULSE WAVE | ADVERTISEMENT IMAGE P1 | POSITION INFORMATION P1 |
| | ADVERTISEMENT IMAGE P2 | POSITION INFORMATION P2 |
| | ADVERTISEMENT IMAGE P3 | POSITION INFORMATION P3 |
| | ⋮ | ⋮ |
| ⋮ | ⋮ | ⋮ |

Fig. 8

| | | | |
|---|---|---|---|
| KEYWORD 11 | TYPE 1 | ADVERTISEMENT IMAGE 11 | POSITION INFORMATION 11 |
| KEYWORD 12 | | ADVERTISEMENT IMAGE 12 | POSITION INFORMATION 12 |
| KEYWORD 13 | | ADVERTISEMENT IMAGE 13 | POSITION INFORMATION 13 |
| ⋮ | | ⋮ | ⋮ |
| KEYWORD 21 | TYPE 2 | ADVERTISEMENT IMAGE 21 | POSITION INFORMATION 21 |
| KEYWORD 22 | | ADVERTISEMENT IMAGE 22 | POSITION INFORMATION 22 |
| KEYWORD 23 | | ADVERTISEMENT IMAGE 23 | POSITION INFORMATION 23 |
| ⋮ | | ⋮ | ⋮ |
| KEYWORD 31 | TYPE 3 | ADVERTISEMENT IMAGE 31 | POSITION INFORMATION 31 |
| KEYWORD 32 | | ADVERTISEMENT IMAGE 32 | POSITION INFORMATION 32 |
| KEYWORD 33 | | ADVERTISEMENT IMAGE 33 | POSITION INFORMATION 33 |
| ⋮ | ⋮ | ⋮ | ⋮ |
| KEYWORD A1 | TYPE A | ADVERTISEMENT IMAGE A1 | POSITION INFORMATION A1 |
| KEYWORD A2 | | ADVERTISEMENT IMAGE A2 | POSITION INFORMATION A2 |
| KEYWORD A3 | | ADVERTISEMENT IMAGE A3 | POSITION INFORMATION A3 |
| ⋮ | | ⋮ | ⋮ |
| KEYWORD B1 | TYPE B | ADVERTISEMENT IMAGE B1 | POSITION INFORMATION B1 |
| KEYWORD B2 | | ADVERTISEMENT IMAGE B2 | POSITION INFORMATION B2 |
| KEYWORD B3 | | ADVERTISEMENT IMAGE B3 | POSITION INFORMATION B3 |
| ⋮ | | ⋮ | ⋮ |
| KEYWORD C1 | TYPE C | ADVERTISEMENT IMAGE C1 | POSITION INFORMATION C1 |
| KEYWORD C2 | | ADVERTISEMENT IMAGE C2 | POSITION INFORMATION C2 |
| KEYWORD C3 | | ADVERTISEMENT IMAGE C3 | POSITION INFORMATION C3 |
| ⋮ | | ⋮ | ⋮ |
| ⋮ | ⋮ | ⋮ | ⋮ |

Fig. 22

| ADVERTISING CONTENT | POSITION OF ADVERTISEMENT TARGET | ENVIRONMENTAL CONDITION | TIMING CONDITION | TRAVELING STATE |
|---|---|---|---|---|
| ADVERTISEMENT IMAGE 1 | POSITION 1 | ENVIRONMENTAL CONDITION 1 | TIMING 1 | TRAVELING STATE 1 |
| ADVERTISEMENT IMAGE 2 | POSITION 2 | ENVIRONMENTAL CONDITION 2 | TIMING 2 | TRAVELING STATE 2 |
| ADVERTISEMENT IMAGE 3 | POSITION 3 | ENVIRONMENTAL CONDITION 3 | TIMING 3 | TRAVELING STATE 3 |
| ADVERTISEMENT IMAGE 4 | POSITION 4 | ENVIRONMENTAL CONDITION 4 | TIMING 4 | TRAVELING STATE 4 |
| ADVERTISEMENT IMAGE 5 | POSITION 5 | ENVIRONMENTAL CONDITION 5 | TIMING 5 | TRAVELING STATE 5 |
| ADVERTISEMENT IMAGE 6 | POSITION 6 | ENVIRONMENTAL CONDITION 6 | TIMING 6 | TRAVELING STATE 6 |
| ADVERTISEMENT IMAGE 7 | POSITION 7 | ENVIRONMENTAL CONDITION 7 | TIMING 7 | TRAVELING STATE 7 |
| ADVERTISEMENT IMAGE 8 | POSITION 8 | ENVIRONMENTAL CONDITION 8 | TIMING 8 | TRAVELING STATE 8 |
| ⋮ | ⋮ | ⋮ | ⋮ | ⋮ |

Fig. 23

| ADVERTISING CONTENT | POSITION OF ADVERTISEMENT TARGET | ENVIRONMENTAL CONDITION | TIMING CONDITION | TRAVELING STATE |
|---|---|---|---|---|
| ADVERTISEMENT IMAGE 1 | POSITION 1 | RAINY WEATHER | NONE | NONE |
| ADVERTISEMENT IMAGE 2 | POSITION 2 | HIGH TEMPERATURE | NONE | NONE |
| ADVERTISEMENT IMAGE 3 | POSITION 3 | NONE | WINTER | NONE |
| ADVERTISEMENT IMAGE 4 | POSITION 4 | SUNNY/CLOUDY | DECEMBER TO MAY | NONE |
| ADVERTISEMENT IMAGE 5 | POSITION 5 | HIGH TEMPERATURE | SUMMER | NONE |
| ADVERTISEMENT IMAGE 6 | POSITION 6 | HUMIDITY 80% OR MORE | NONE | NONE |
| ADVERTISEMENT IMAGE 7 | POSITION 7 | NONE | SUMMER | 30 km/H OR LESS |
| ADVERTISEMENT IMAGE 8 | POSITION 8 | NONE | NONE | 60 km/H OR MORE |
| ⋮ | ⋮ | ⋮ | ⋮ | ⋮ |

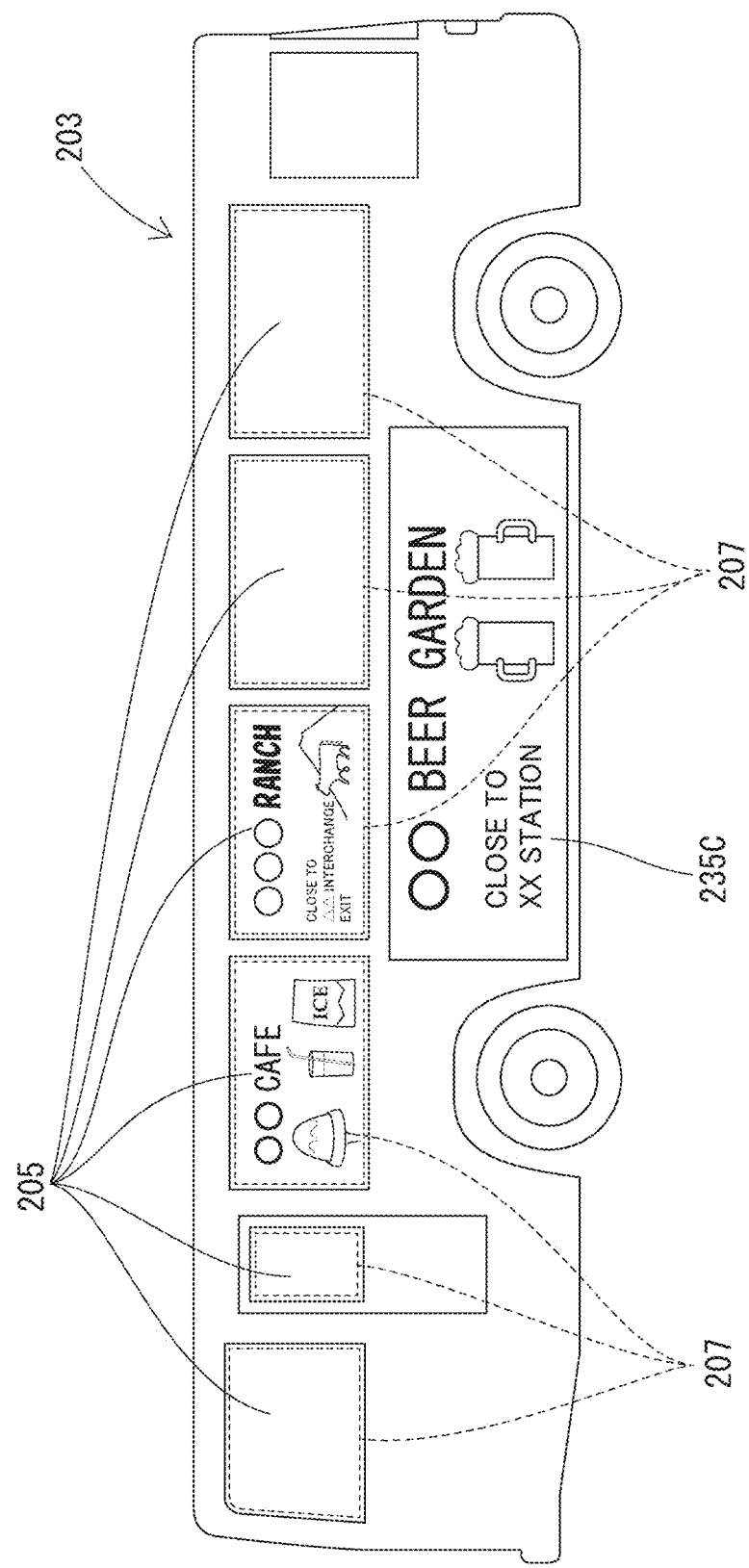

VEHICLE ADVERTISEMENT DISPLAY SYSTEM

CROSS-REFERENCE TO RELATED APPLICATION

The present disclosure relates to a vehicle advertisement display system. This application is based on and claims the priority of Japanese Patent Application No. 2019-108569 filed on Jun. 11, 2019 and Japanese Patent Application No. 2019-108571 filed on Jun. 11, 2019, the entire contents of each of which are incorporated herein by reference.

BACKGROUND OF THE INVENTION

In vehicles such as buses and trains, advertisement information is provided to occupants through hanging advertisements or wall advertisements provided in the interior of the vehicle. This type of advertisement employs methods such as painting the exterior surface of the vehicle, displaying advertisements on paper media, providing a display device on the exterior surface, and playing advertising videos with predetermined contents; thus, methods for providing advertisement information to people outside the vehicle are also used. There are also advertisements relating to vehicles, such as those disclosed in Japanese Unexamined Patent Publication No. 2001-246988 and Japanese Unexamined Patent Publication No. 11-237854. Japanese Unexamined Patent Publication No. 2001-246988 and Japanese Unexamined Patent Publication No. 11-237854 disclose examples of the vehicles, as this type of technology, in which the vehicle attempts to perform an outdoor advertisement using a vehicle.

Regarding First Disclosure

The advertisement provided in the interior of the vehicle has a predetermined advertising content, and is not one provided after specifically grasping the condition of the occupant. Therefore, the advertisement may hardly match the occupant's interest, and there is room for improvement in terms of advertising effect.

The first disclosure has been made in view of the above circumstances, and aims to provide a vehicle advertisement display system capable of displaying in the interior of the vehicle an advertisement suited to an occupant.

Regarding Second Disclosure

In the conventional advertising method, the content of the advertisement provided toward the inside or the outside of the vehicle has been determined in advance, and the advertisement cannot be changed to the advertisement suitable for the situation of the vehicle. When the content of the advertisement is thus fixed, advertisement suitable for the situation of the vehicle may hardly be performed. Therefore, there is room for improvement in terms of advertising effect.

The second disclosure has been made in view of the above circumstances, and aims to provide a vehicle advertisement display system capable of performing advertisement suitable for the situation of the vehicle.

SUMMARY OF THE INVENTION

First Disclosure

A vehicle advertisement display system to be mounted on a vehicle, the vehicle advertisement display system including:

a display unit that performs display at least toward an interior of the vehicle;

a detection unit that detects at least one of a state of an occupant riding the vehicle or a motion of the occupant, as a target; and a control unit that causes the display unit to display an advertisement image having an advertising content corresponding to the target detected by the detection unit based on correspondence information that defines the advertising content corresponding to each candidate of the target.

Second Disclosure

A vehicle advertisement display system to be mounted on a vehicle, the vehicle advertisement display system including:

a display unit;

an information acquiring unit configured to acquire at least one of position information of the vehicle, information of a traveling state of the vehicle, and environmental information of an inside or an outside of the vehicle, as a target; and a display control unit that selects an advertisement image having a content corresponding to the target acquired by the information acquiring unit from among a plurality of advertisement image candidates and causes the display unit to display the advertisement image.

In the vehicle advertisement display system of the first disclosure, the detection unit can detect at least one of the "state of the occupant" and the "motion of the occupant" as a target. Then, the control unit can cause the display unit to display the advertisement image having the advertising content corresponding to the target detected by the detection unit, based on the correspondence information that defines the advertising content corresponding to each candidate of the target. In other words, the vehicle advertisement display system described above can display an advertisement image suited to the state of the occupant or the motion of the occupant toward the interior of the vehicle, which can increase the possibility that the occupant get interested in the advertisement.

The vehicle advertisement display system of the second disclosure can acquire at least one of the position information of the vehicle, the information on the traveling state of the vehicle, and the environmental information of an inside or an outside of the vehicle as a target, select an advertisement image having a content corresponding to the acquired target, and display the advertisement image. In other words, instead of displaying only a fixed advertisement determined in advance toward the inside or the outside of the vehicle, advertisement can be performed with the content corresponding to at least one of the actual position of the vehicle, the actual traveling state, and the actual environment of the inside or the outside of the vehicle. Therefore, advertisement suitable for the situation at the time of displaying the advertisement is easily performed, and advertisement that meets the interests and needs of the viewer of the advertisement is easily performed.

BRIEF DESCRIPTION OF THE DRAWINGS

FIG. 7 is an explanatory view conceptually explaining data configuration in which the state of the occupant, the advertisement image, and the position information are associated with each other;

FIG. 8 is an explanatory view conceptually explaining data configuration in which the motion of the occupant, the advertisement image, and the position information are associated with each other;

FIG. 22 is an explanatory view conceptually showing a data configuration in which the position of an advertisement target, environmental conditions, timing conditions, traveling state conditions, and the like are defined in association with each advertisement image;

FIG. 23 is an explanatory view conceptually showing a specific example of the data configuration in FIG. 22;

FIG. 27 is an explanatory view showing an example different from FIGS. 24 and 26 of an advertisement display toward the outside of the vehicle 203.

DETAILED DESCRIPTION

Figure 1:
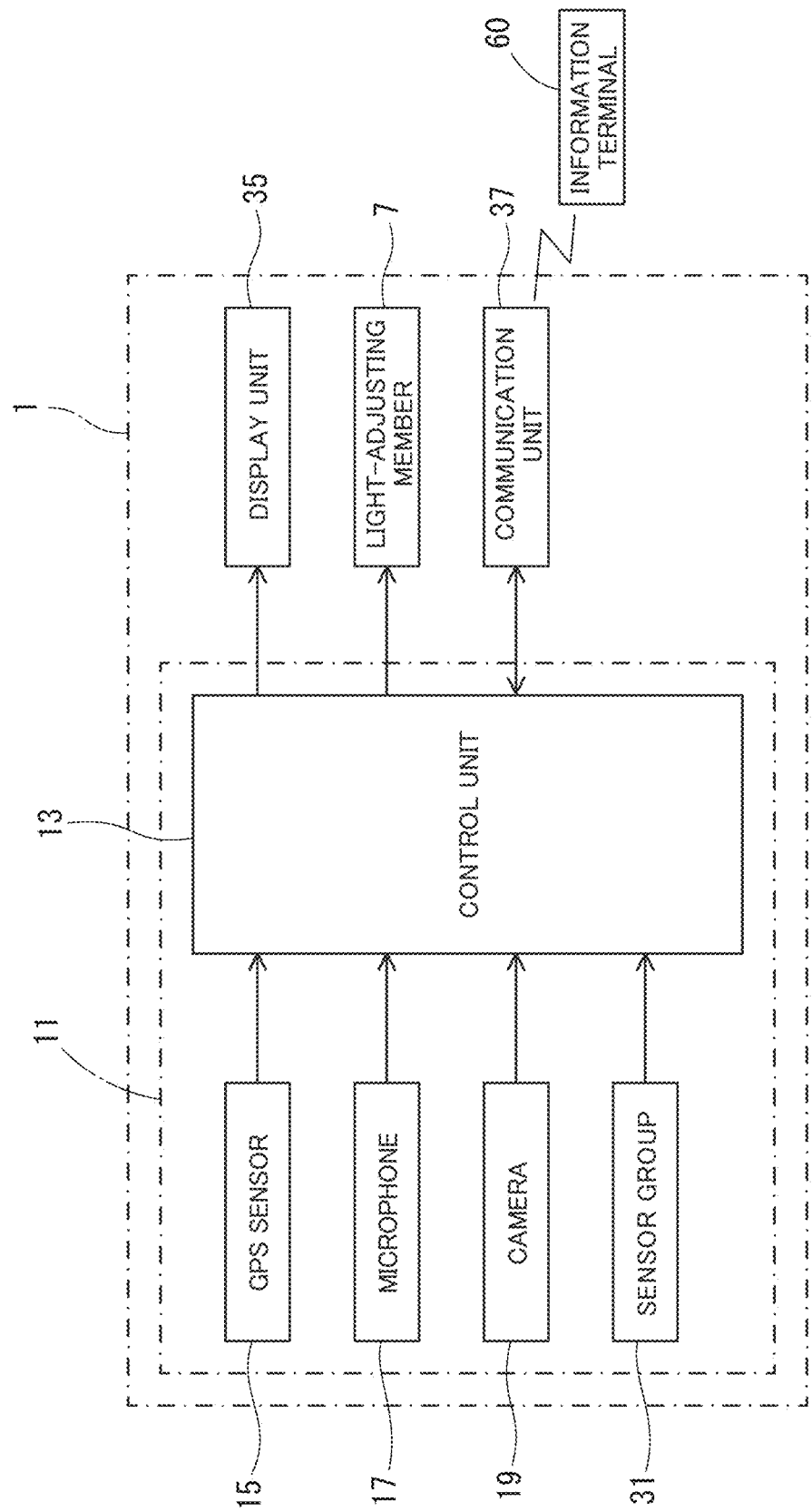
FIG. 1 is a block diagram conceptually showing the overall configuration of a vehicle advertisement display system 1.

Here, desirable examples of a first disclosure will be described.

In the vehicle advertisement display system, the correspondence information further includes position information in which a display position in the interior of the vehicle is defined in association with each of the advertising contents, and the control unit controls the display unit to display the advertisement image having the advertising content corresponding to the target detected by the detection unit at a position corresponding to the advertising content based on the position information.

With this configuration, not only the advertisement image having the content suited to the occupant can be displayed, but also the advertisement image can be displayed at a position suited to the content of the advertisement image. Therefore, the advertising effect can be enhanced by devising display positions.

In the vehicle advertisement display system, the detection unit further includes, an imaging unit that images the occupant, and an image analyzing unit that specifies the state of the occupant based on an image captured by the imaging unit.

With this configuration, the state of the occupant can be specified based on the captured image of the occupant. Accordingly, an advertisement image suited to the state of the occupant can be easily displayed without imposing an excessive burden on the occupant.

In the vehicle advertisement display system, the detection unit further includes, a sensor that senses a body of the occupant, and a detection result analyzing unit that specifies the state of the occupant based on a detection result by the sensor.

With this configuration, the state of the occupant can be specified based on the detection result when the occupant's body is sensed by the sensor. Accordingly, an advertisement image suited to the state of the occupant can be easily displayed without imposing an excessive burden on the occupant.

In the vehicle advertisement display system, the detection unit further includes, a voice detecting unit that detects a voice uttered by the occupant, and a voice analyzing unit that specifies the motion of the occupant based on the voice detected by the voice detecting unit.

With this configuration, the motion of the occupant can be specified by the voice uttered by the occupant. Accordingly, an advertisement image suited to the motion of the occupant can be easily displayed without imposing an excessive burden on the occupant.

In the vehicle advertisement display system, the detection unit further includes, an information acquiring unit that acquires information on an operation content when the occupant operates an information terminal, and an information analyzing unit that specifies the motion of the occupant based on the information acquired by the information acquiring unit.

With this configuration, the motion of the occupant can be specified based on the information on the operation content when the occupant operates the information terminal. Accordingly, an advertisement image suited to the motion of the occupant can be easily displayed without imposing an excessive burden on the occupant. Furthermore, since the information personally operated by the occupant can be taken into account, an advertisement image that matches more the occupant's interest can be easily displayed.

Here, desirable examples of a second disclosure will be described.

In the vehicle advertisement display system, the display unit displays the advertisement image at least toward an outside of the vehicle.

With this configuration, an advertisement having the content corresponding to at least one of the actual position of the vehicle, the actual traveling state, and the actual environment of the inside or the outside of the vehicle can be displayed toward the outside of the vehicle. Therefore, advertisement that meets the interests and needs of the person who sees the advertisement outside the vehicle is easily performed.

In the vehicle advertisement display system, the information acquiring unit acquires at least the position information, and the display control unit causes the display unit to display an advertisement image related to a location close to the position of the vehicle from among a plurality of advertisement image candidates based on the position information acquired by the information acquiring unit.

With this configuration, an advertisement related to a location close to the current position of the vehicle can be displayed, so that a viewer of the advertisement may easily go to the location related to the advertisement. Thus, the advertisement effect can be further enhanced.

In the vehicle advertisement display system, the information acquiring unit acquires at least one of weather, temperature, and humidity, as the environmental information, and the display control unit selects an advertisement image having a content corresponding to the environmental information from a plurality of advertisement image candidates based on correspondence information in which environmental conditions and advertising contents are associated with each other and the environmental information acquired by the information acquiring unit, and causes the display unit to display the advertisement image.

With this configuration, an advertisement corresponding to the current environment of the vehicle (particularly, weather, temperature, humidity) can be displayed, so that advertisement suitable for the environment when displaying the advertisement is easily performed. Thus, advertisement that meets the interests and needs of the viewer of the advertisement can be easily performed.

In the vehicle advertisement display system, the information acquiring unit acquires both the position information and the environmental information, and the display control unit selects the advertisement image having a content corresponding to a combination of the position information and the environmental information acquired by the information acquiring unit, and causes the display unit to display the advertisement image.

With this configuration, an advertisement corresponding to both of the current position and the environment of the vehicle can be displayed, so that advertisement that further meets the interests and needs of the viewer of the advertisement can be easily performed.

The vehicle advertisement display system further includes
a light-adjusting member arranged in an incident portion which an external light enters, and
a light-adjusting control unit that switches the light-adjusting member between a state of a first transmittance and a state of a second transmittance smaller than the first transmittance.

In the vehicle advertisement display system, the light-adjusting control unit switches the light-adjusting member to the state of the second transmittance when a predetermined condition is established, and the display control unit displays the advertisement image on the light-adjusting member when the light-adjusting member has been switched to the state of the second transmittance.

With this configuration, the position where the light-adjusting member is arranged can be effectively used as the advertisement position.

Regarding First Disclosure

1. Outline of Vehicle Advertisement Display System 1

Figure 2:
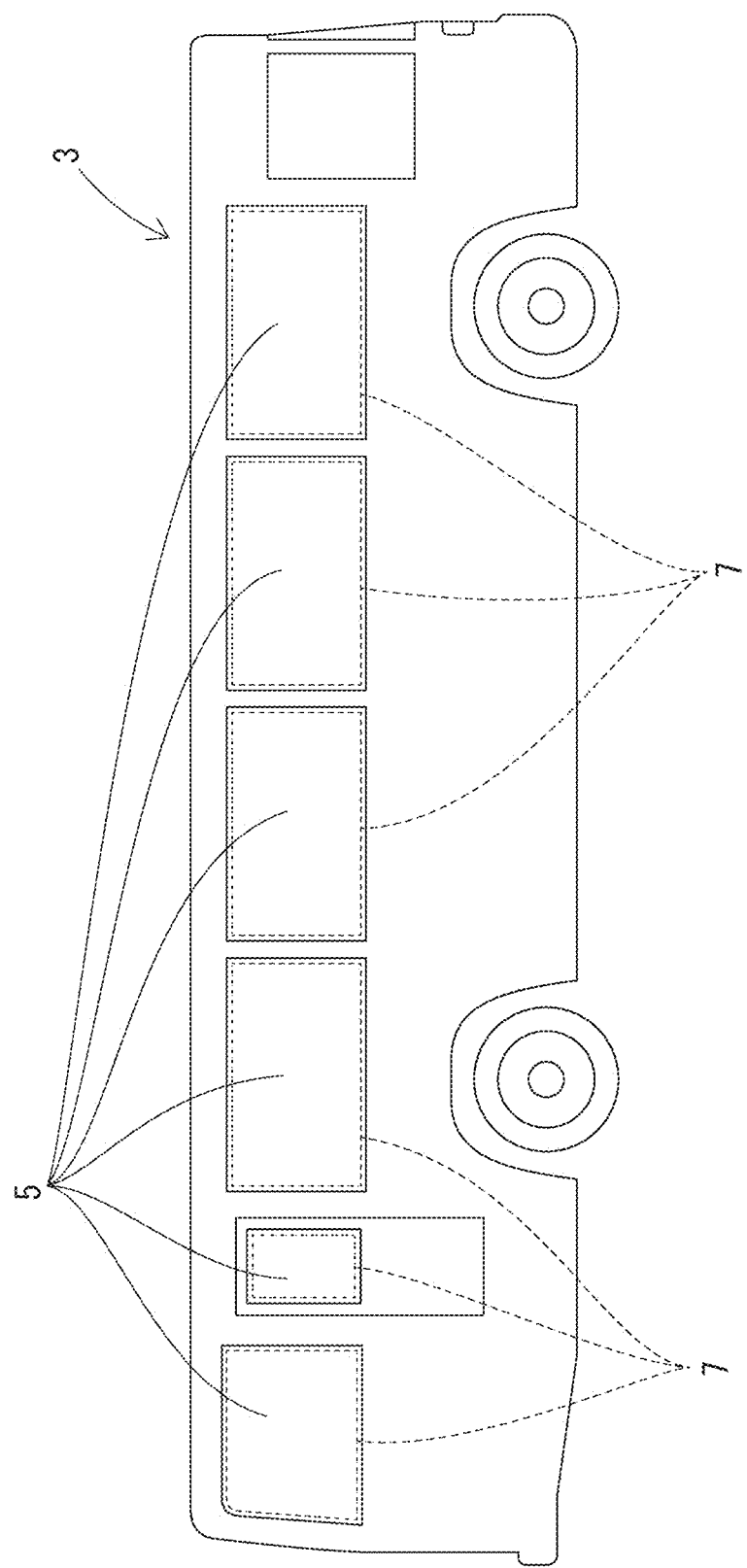
FIG. 2 is a conceptual view conceptually showing a vehicle 3 on which the vehicle advertisement display system 1 is mounted.

An embodiment of a vehicle advertisement display system 1 (hereinafter, also simply referred to as a system 1) of the present disclosure will be described in detail with reference to the drawings. FIG. 1 is a block diagram conceptually showing a vehicle advertisement display system 1. FIG. 2 is an explanatory view showing a vehicle 3 (bus) on which the vehicle advertisement display system 1 is mounted.

The system 1 is a system that is mounted on the vehicle 3 as shown in FIG. 2, and that can perform advertisement directed toward at least the interior of the vehicle 3. The system 1 includes a display unit 35 that displays, toward the interior of the vehicle 3, an image that can be visually recognized in the interior of the vehicle 3, a light-adjusting member 7 arranged in an incident portion 5 (FIGS. 2 and 3) which an external light enters, and a control unit 13 (ECU (Electronic Control Unit)). Furthermore, the system 1 includes a GPS sensor 15, a microphone 17, a camera 19, and a sensor group 31.

The control unit 13 includes a CPU (Central Processing Unit), a memory (e.g., a ROM (Read Only Memory), a RAM (Random Access Memory)), and the like. The control unit 13 is configured to be able to communicate with the light-adjusting member 7 and the display unit 35 by wired communication or wireless communication, and has a function of controlling the transmittance of the light-adjusting member 7 and a function of controlling the display content of the display unit 35. Furthermore, the control unit 13 is configured to be able to communicate with the GPS sensor 15, the microphone 17, the camera 19, and the sensor group 31 by wired communication or wireless communication, and to be able to acquire information therefrom. Although illustration is omitted, an operation input unit such as an operation key and an operation button for accepting an operation from an occupant such as a driver may also be provided, and in this case, information corresponding to the operation performed on the operation input unit is input to the control unit 13.

Figure 3:
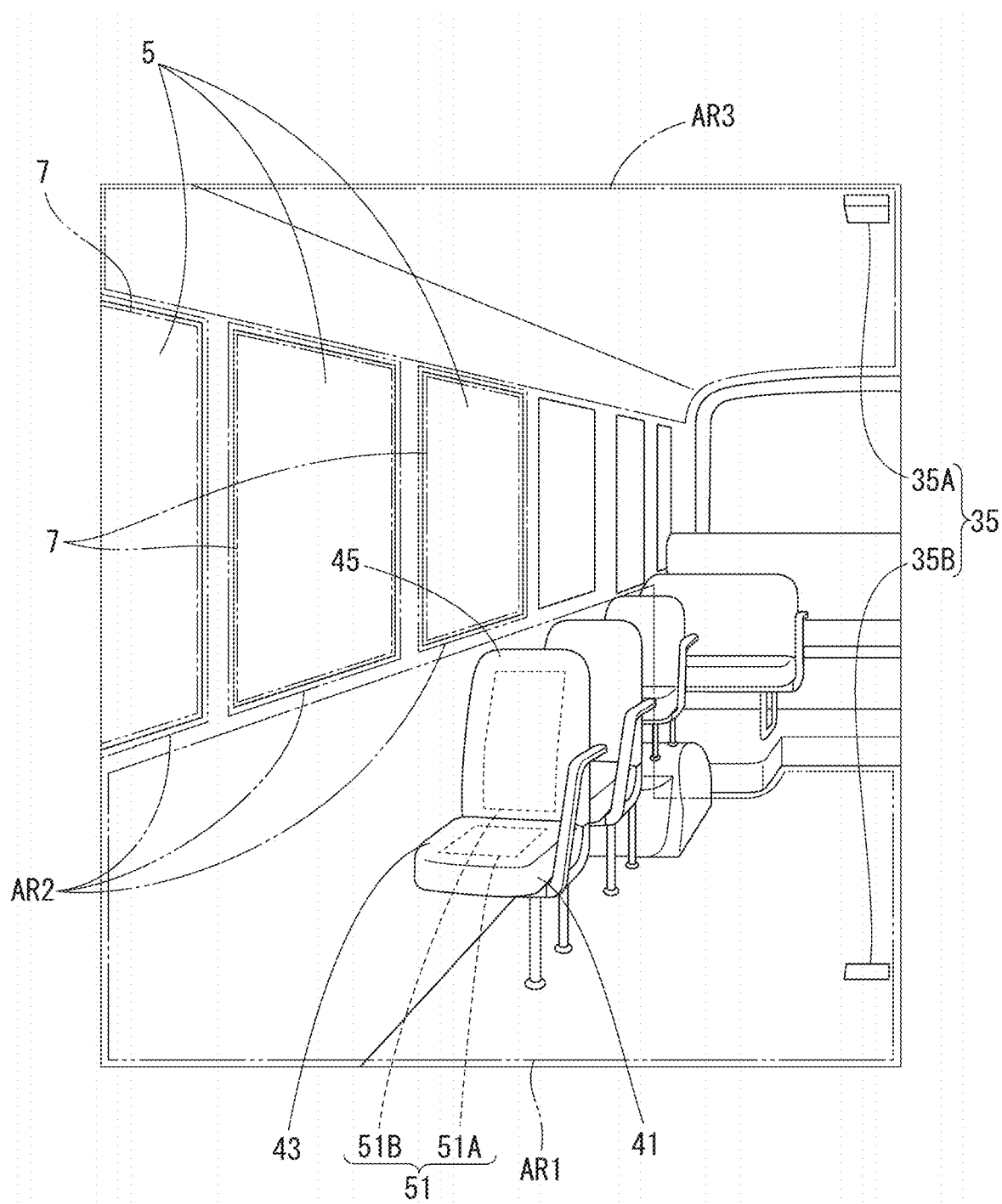
FIG. 3 is a conceptual view conceptually showing a state of an interior of the vehicle 3.

The incident portion 5 is, for example, a transparent plate section that separates the interior and the exterior of the vehicle 3, and constituted as, for example, a window glass capable of closing an opening of a window frame. In the example of FIG. 3, a plurality of incident portions 5 are provided on a side surface (inner side surface) of the interior.

Figure 4:
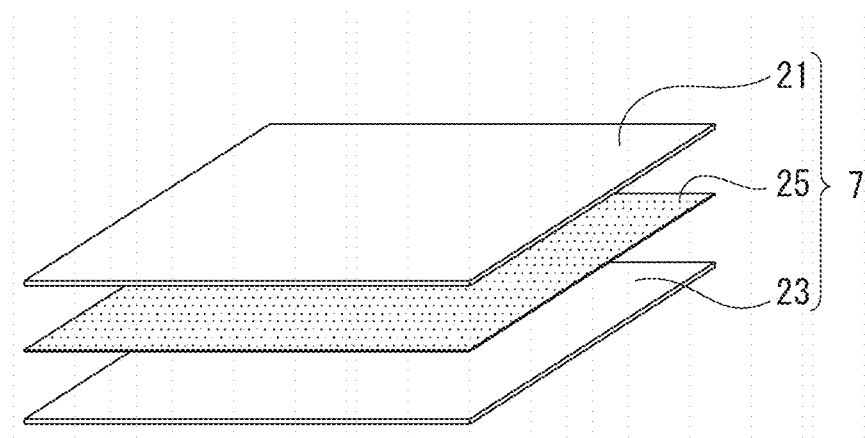
FIG. 4 is an exploded perspective view showing a light-adjusting member 7.
Figure 5:
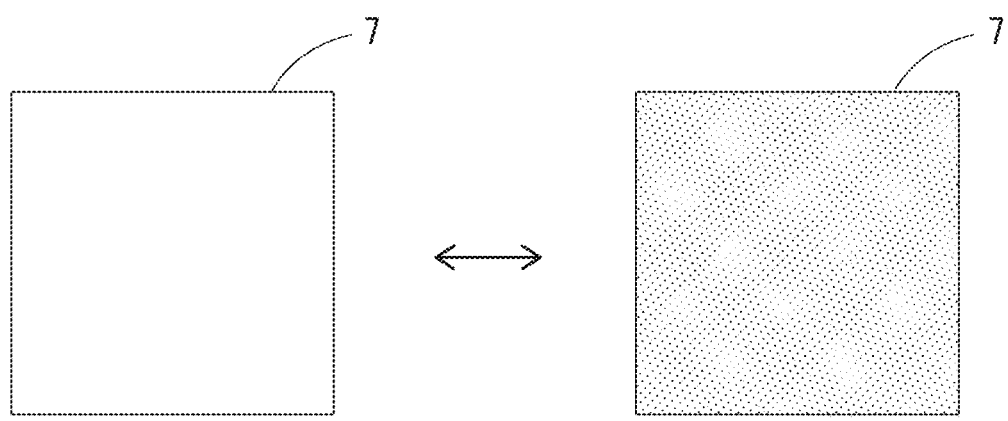
FIG. 5 is an explanatory view showing a change in transmittance of the light-adjusting member 7.

The light-adjusting member 7 is provided at each of the incident portions 5. The light-adjusting member 7 may be attached from the vehicle exterior side, or may be sandwiched between glass plates of the laminated glass of each window by way of an intermediate film. FIG. 4 schematically shows an example of the light-adjusting member 7. As shown in FIG. 4, in the light-adjusting member 7, a light-adjusting film 25 is disposed between a first electrode 21 and a second electrode 23, and the transmittance is changed by a voltage applied in between the first electrode 21 and the second electrode 23. For example, the light-adjusting member 7 becomes transparent or high transmittance when voltage is applied as shown in the left figure of FIG. 5, and becomes opaque or low transmittance when no voltage is applied as shown in the right figure of FIG. 5. FIGS. 4 and 5 simply show an example of the light-adjusting member 7. The shape of the light-adjusting member 7 arranged in each of the incident portions 5 can be set according to the shape of the incident portion 5.

As the light-adjusting film 25, there is suitably exemplified (1) a light-adjusting film 25 using an EC (Electro Chromic) method, (2) a light-adjusting film 25 using an SPD (Suspended Particle Device) method, (3) a light-adjusting film 25 using liquid crystals of VA (Vertical Alignment) method, TN (Twisted Nematic) method or IPS (In-Place-Switching) method.

The light-adjusting film 25 using the EC method has a structure in which a light-adjusting layer (electrolyte layer) is sandwiched between a pair of electrodes. The color of the light-adjusting layer changes between transparent and dark blue according to the potential difference between the electrodes using the oxidation-reduction reaction.

The light-adjusting film 25 using the SPD method is usually colored dark blue using the orientation of fine particles, but changes to transparent when voltage is applied, and returns to the original dark blue when the voltage is turned off. Thus, light and shade can be adjusted by the voltage.

Further, the light-adjusting film 25 using a PDLC (Polymer Dispersed Liquid Crystal) method may be used. The light-adjusting film 25 using the PDLC method has a network structure made of a special polymer formed in the liquid crystal layer, wherein a state in which an array of liquid crystal molecules is irregular is induced by the action of the polymer network, so that light is scattered. When a voltage is applied to array the liquid crystal molecules in the direction of the electric field, light is not scattered so that a transparent state is obtained.

The control unit 13 has a function of controlling the transmittance of the light-adjusting member 7. The control unit 13 determines a member that shields light and a member that does not shield light among the plurality of light-adjusting members 7, and adjusts the transmittance of the member that shields light at least. When the transmittance of each light-adjusting member 7 is adjusted in two stages, the transmittance of the member that shields light is adjusted within a first range, and the transmittance of the member that does not shield light is adjusted within a second range. For example, the transmittance of visible light (e.g., wavelength of 380 nm to 750 nm) of the member that shields light is adjusted to be within the first range (e.g., 0 to 30%), and the transmittance of visible light of the member that does not shield light is adjusted to be within the second range (e.g., 70 to 100%). When the adjustment is thus performed in two stages, the first range, which is the transmittance of the visible light of the member that shields light, is smaller than the second range, which is the transmittance of the visible light of the member that does not shield light (first range<second range). The above-described adjustment performed in two stages is merely an example. The transmittance of the member that does not shield light may be changed in multi-stages of two or more stages, or continuously, by changing the potential difference between the electrodes.

The term "shielding light" as used in the present specification means not only completely shielding light but also weakening the transmission of light (specifically, suppressing the transmittance of light to less than a reference transmittance (e.g., transmittance of the second range)).

The display unit 35 is a device that can perform display at least toward the interior of the vehicle 3. The display unit 35 is constituted of, for example, one or more projectors, and can display various images on a plurality of display areas AR1 to AR3 in the interior of the vehicle 3. Specifically, the display unit 35 is configured to be able to perform display on each of the display areas AR1 to AR3 individually. The lower display area AR1 (hereinafter, also referred to as display area AR1) is an area including a floor of the interior, and specifically, an area located on the lower side of the windows. The window side display area AR2 (hereinafter, also referred to as display area AR2) is an area of each window. When the control unit 13 controls the display unit 35 to display an image in any of the display areas AR2, the control unit 13 sets the transmittance of the light-adjusting member 7 provided in the display area AR2 where the image is to be displayed to the first range, for example, so that the light-adjusting member 7 is set in the light-shielding state, and then displays the image therein. The upper display area AR3 (hereinafter, also referred to as display area AR3) is an area including a ceiling of the interior, and specifically, an area located on an upper side of the windows. Each of the display areas AR1, AR2, and AR3 may be further subdivided. In the example of FIG. 3, a first display unit 35A which is the display unit 35 provided on the ceiling side is configured to be able to display an image in the display areas AR1 and AR2, and a second display unit 35B which is the display unit 35 provided on the floor side is configured to be able to display an image in the display area AR3.

A communication unit 37 includes one or more communication devices that can perform wired communication or wireless communication with an external device. The communication unit 37 is configured to be able to communicate with an information terminal 60 possessed by the occupant. The communication unit 37 includes, for example, a communication device capable of performing wireless communication through a known first wireless communication method (e.g., a communication method conforming to a known short-range wireless communication standard, such as Bluetooth (registered trademark)), a communication device capable of performing wireless communication through a known second wireless communication method (e.g., a communication method conforming to a wireless LAN standard, such as Wi-Fi (registered trademark)), and a communication device capable of performing wireless communication through a communication method conforming to the standard of mobile communication system, such as LTE (Long Term Evolution) communication. The communication unit 37 is configured to be able to communicate with a public network (not shown) such as the Internet, and to be able to communicate with the information terminal 60 via the public network. The communication unit 37 may be configured to be able to communicate directly with the information terminal 60 by a short-range communication method such as Bluetooth (registered trademark) communication, or may be configured to be capable of communication through another known method as long as it can communicate with the information terminal 60.

The information terminal 60 is a terminal possessed by the occupant, and is a terminal that can be a communication partner of the communication unit 37. The information terminal 60 is constituted of an information processing terminal such as a smartphone, a tablet terminal, a mobile phone, and a portable computer. The information terminal 60 is configured to be capable of performing short-distance communication such as Bluetooth (registered trademark) communication, wireless LAN communication such as Wi-Fi (registered trademark) communication, communication using a mobile communication system such as LTE communication, and the like, and capable of performing information communication with the system 1.

The GPS sensor 15 is constituted of a known GPS receiver, and is configured to receive information from a GPS satellite (not shown), and calculate the current position (detailed latitude and longitude) of the vehicle 3 provided with the GPS sensor 15. The GPS sensor 15 may be of any known type as long as the GPS sensor can grasp the current position of the vehicle 3 based on information from the GPS satellite.

The microphone 17 has a function of converting the sound in the interior of the vehicle 3 into an electric signal, and a function of detecting a voice uttered by an occupant. The microphone 17 may be constituted of a plurality of microphones, or may be constituted of a single microphone. In a case where a plurality of microphones is provided, each microphone may preferably be provided near each seat so as to detect the sound near each seat.

The camera 19 is constituted of an imaging unit that images the interior of the vehicle 3. The camera 19 has a function of imaging an occupant riding the vehicle 3 and generating an captured image of the occupant. The camera 19 may be constituted of a plurality of imaging units, or may be constituted of a single imaging unit. In a case where a plurality of imaging units is provided, the imaging units may preferably be arranged so as to be able to image the face of each occupant sitting on the seat.

The sensor group 31 includes, for example, a plurality of types of sensors. Specifically, it includes a plurality of pressure sensors 51 and other biological information sensors arranged on each seat. The pressure sensor 51 arranged on each seat includes a first pressure detection unit 51A that detects pressure received by a seat surface 43 of the seat and a second pressure detection unit 51B that detects pressure received by a front surface 45 of the backrest of the seat. Although FIG. 3 conceptually shows only the pressure sensor 51 provided on the seat 41, similar pressure sensors are provided on other seats. As the biological information sensors included in the sensor group 31, a pulse wave sensor that detects a pulse wave of an occupant seated in each seat, a blood pressure sensor that detects a blood pressure of an occupant seated in each seat, other known biological information sensors may be provided in addition to the pressure sensor 51 provided in each seat.

In the present specification, the occupant is a general term for a person riding the vehicle 3, and the type of person is irrelevant. For example, the occupant may be a passenger riding the vehicle 3 or may be a person engaged in a job in the vehicle 3.

In the present configuration, the detection unit 11 is constituted of the control unit 13, the GPS sensor 15, the microphone 17, the camera 19, and the sensor group 31. The detection unit 11 is a unit that detects at least one of the state of the occupant or the motion of the occupant riding the vehicle 3.

2. Advertisement Display Control

Next, the advertisement display control performed by the system 1 will be described.

Figure 6:
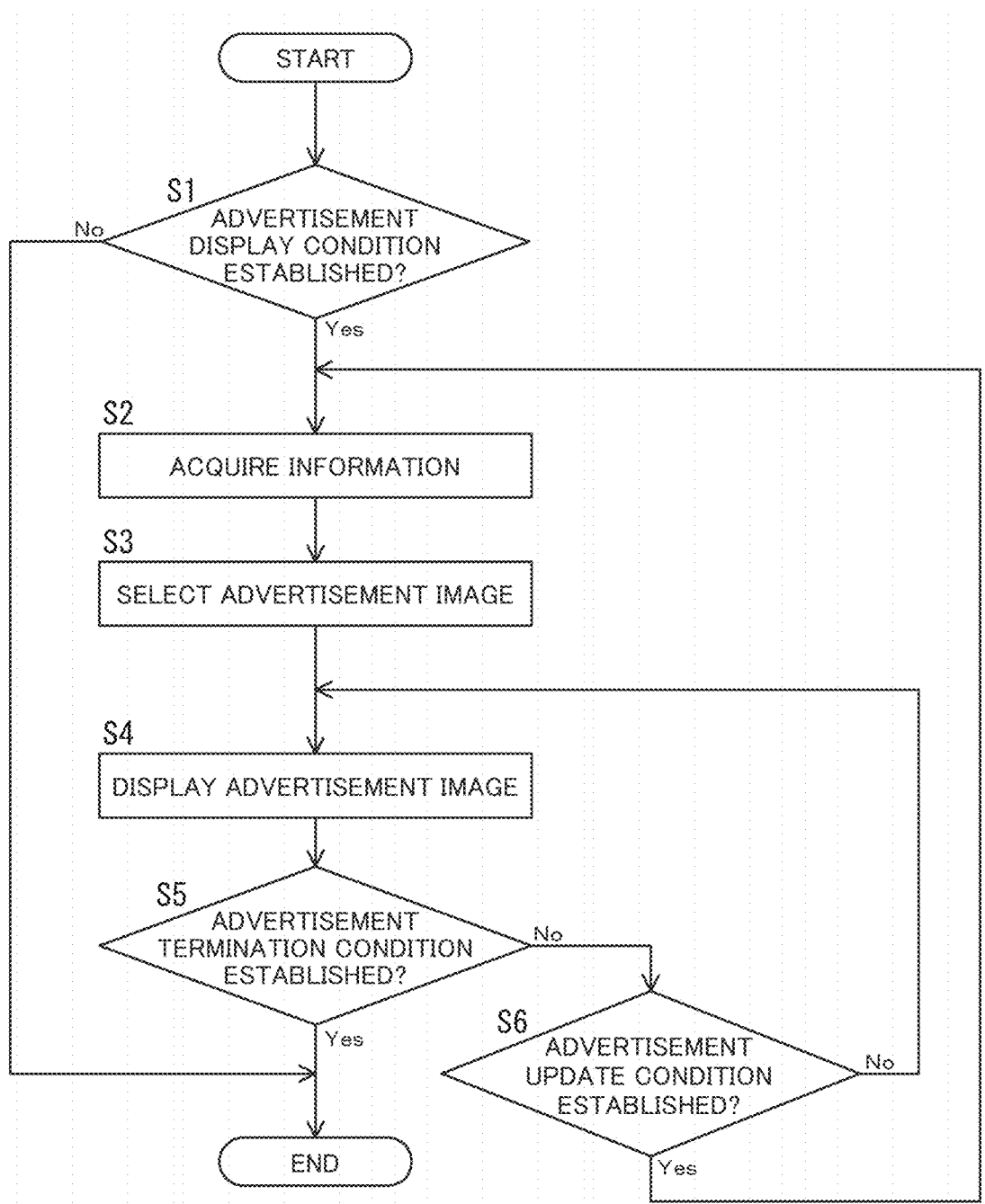
FIG. 6 is a flowchart showing a flow of advertisement display control performed in the vehicle advertisement display system 1.

The advertisement display control shown in FIG. 6 is, for example, a control that is started by the control unit 13 in response to establishment of a predetermined start condition and repeatedly executed by the control unit 13. The condition (start condition) for starting the advertisement display control in FIG. 6 may be, for example, that power supply to the control unit 13 shown in FIG. 1 has started, or that a predetermined operation has been performed on an operation unit (not shown) and information corresponding to the predetermined operation has been input to the control unit 13. Alternatively, other start conditions may be used.

With the start of the advertisement display control shown in FIG. 6, the control unit 13 determines whether or not the advertisement display condition is established in step S1. The advertisement display condition may be, for example, that an operation of instructing advertisement display to an operation unit (not shown) has been performed, or that a time condition defined in advance has been established (e.g., a time slot in which an advertisement is to be displayed has been reached), or may be other conditions (e.g., that presence of an occupant in the interior of the vehicle 3 has been detected, etc.).

When determining that the advertisement display condition is not established in step S1, the control unit 13 determines as "No" in step S1, and ends the advertisement display control shown in FIG. 6. In a case where it is determined as "No" in step S1 or "Yes" in step S5 so that the advertisement display control shown in FIG. 6 is ended, the control unit 13 repeats the advertisement display control so as to start again the advertisement display control of FIG. 6 after a predetermined time from the end of the advertisement display control.

When determining that the advertisement display condition is established in step S1, the control unit 13 determines as "Yes" in step S1, and acquires information on the occupant seated on the seat in step S2. In the following description, an example in which the control of steps S2 to S6 is performed with respect to the occupant seated on the seat 41 will be described, but the control of steps S2 to S6 may be performed with respect to each occupant seated on each seat individually.

When performing the process of step S2 with respect to the occupant seated on the seat 41, the control unit 13 functions so that each element of the detection unit 11 including the control unit 13 cooperatively operate to detect the "state of the occupant" and the "motion of the occupant" seated on the seat 41, as a target. Specifically, first, the camera 19 captures an image of the face of the occupant seated on the seat 41. In this example, the camera 19 corresponds to an example of an imaging unit that images an occupant. Furthermore, the microphone 17 and the control unit 13 obtain a voice uttered by the occupant seated on the seat 41. In this example, the microphone 17 corresponds to an example of a voice detecting unit that detects a voice uttered by the occupant. Moreover, the sensor group 31 senses the body of the occupant seated on the seat 41. In this example, the sensor group 31 corresponds to an example of a sensor that senses the body of an occupant. In addition, the communication unit 37 and the control unit 13 correspond to an example of an information acquiring unit, and acquire information on the operation contents when the occupant operates the information terminal 60.

In the system 1, the correspondence information is stored in advance. The correspondence information is information that defines the advertising content corresponding to each candidate of the target when at least one of the state of the occupant or the motion of the occupant is the target. Specifically, the correspondence information defines a plurality of candidates as the "state of the occupant", defines the advertising content corresponding to each candidate, and defines the display position in the vehicle interior in association with each advertising content. For example, in the example of FIG. 7, candidates such as "state of large fatigue", "state of large sleepiness", "state of large stress", "state of long seated time", "state of high blood pressure", "state of small pulse wave" and the like are defined about the state of the occupant. One or a plurality of advertisement images suitable for the state of each candidate are defined in correspondence with each candidate of the "state of the occupant". Furthermore, position information specifying a position where each advertisement image is to be displayed is defined in correspondence with each advertisement image. For example, a plurality of advertisement images J1, J2, J3, . . . are defined in correspondence with the "state of large fatigue", and position information J1, J2, J3 defining positions where each advertisement image is to be displayed is defined in correspondence with each advertisement image J1, J2, J3. Specifically, when displaying the advertisement image J1 in response to the detection of the "state of large fatigue", the advertisement image J1 is displayed at a position (specifically, one of the display areas AR1, AR2, AR3) specified by the position information J1.

In the correspondence information, a plurality of candidates are defined about the motion of the occupant, and the advertising content corresponding to each candidate is defined. For example, in the example of FIG. 8, the "motion of uttering a voice" is included as the "motion of the occupant", and candidates such as the "motion of uttering a keyword classified as type 1 as a voice", the "motion of uttering a keyword classified as type 2 as a voice", the "motion of uttering a keyword classified as type 3 as a voice" and the like are defined as candidates of the "motion of uttering a voice". In the example of FIG. 8, the keywords classified as type 1 are keywords 11, 12, 13 . . . , the keywords classified as type 2 are keywords 21, 22, 23 . . . , and the keywords classified as type 3 are keywords 31, 32, 33 . . . . In this example, when the occupant utters any of the keywords 11, 12, 13 . . . classified as type 1 as a voice, the control unit 13 determines that the "motion of uttering a keyword classified as type 1 as a voice" has been performed.

One or a plurality of advertisement images suitable for each candidate are defined in correspondence with each candidate of the "motion of uttering a voice". Furthermore, position information specifying a position where each advertisement image is to be displayed is defined in correspondence with each advertisement image. For example, a plurality of advertisement images 11, 12, 13 . . . are defined in correspondence with the "motion of uttering a keyword classified as type 1 as a voice", and position information 11, 12, 13 defining positions where each advertisement image is to be displayed is defined in correspondence with each advertisement image 11, 12, 13 . . . . Then, when displaying the advertisement image 11 in response to the detection of the "motion of uttering a keyword classified as type 1 as a voice", the control unit 13 displays the advertisement image 11 at a position (specifically, one of the display areas AR1, AR2, AR3) specified by the position information 11. Each of the position information 11, 12, 13, 21, 22, 23, 31, 32, 33, . . . is information designating one of the display areas AR1, AR2, AR3.

Further, in the example of FIG. 8, the "motion of the occupant" includes the "motion of searching by the information terminal", and candidates such as the "motion of searching by inputting a keyword classified as type A to the information terminal", "motion of searching by inputting a keyword classified as type B to the information terminal", "motion of searching by inputting a keyword classified as type C to the information terminal" are defined as candidates of the "motion of searching by the information terminal". In the example of FIG. 8, the keywords classified as type A are keywords A1, A2, A3 . . . , the keywords classified as type B are keywords B1, B2, B3 . . . and the keywords classified as type C are keywords C1, C2, C3 . . . . In this example, when the occupant performs a search (e.g., web search) by inputting any of the keywords C1, C2, C3 . . . classified as type C to the information terminal 60, the control unit 13 determines that the "motion of searching by inputting a keyword classified as type C to the information terminal" has been performed.

One or a plurality of advertisement images suitable for each candidate are defined in correspondence with each candidate of the "motion of searching by the information terminal". Furthermore, position information specifying a position where each advertisement image is to be displayed is defined in correspondence with each advertisement image. For example, a plurality of advertisement images C1, C2, C3 . . . are defined in correspondence with the "motion of searching by inputting a keyword classified as type C to the information terminal", and position information C1, C2, C3 defining positions where each advertisement image C1, C2, C3 is to be displayed is defined in correspondence with each advertisement image C1, C2, C3 . . . . When displaying the advertisement image C1 in response to the detection of the "motion of searching by inputting a keyword classified as type C to the information terminal", the control unit 13 displays the advertisement image C1 at a position (specifically, one of the display areas AR1, AR2, AR3) specified by the position information C1. Each of the position information A1, A2, A3, B1, B2, B3, C1, C2, C3, . . . is information designating one of the display areas AR1, AR2, AR3.

As the method in which the control unit 13 acquires information input by the information terminal 60, any method may be used as long as it is a feasible method. For example, in a case where the information terminal 60 and the control unit 13 are in a state capable of communicating with each other by Bluetooth (registered trademark) communication, Wi-Fi communication and the like, and a control device (CPU etc. not shown) provided in the information terminal 60 operates a specific application program, the application program may be configured to transmit a keyword to the system 1 every time the keyword is input in the information terminal 60, under the condition that the communication between the information terminal 60 and the control unit 13 is established.

After acquiring the information on the occupant (information on at least one of "motion of the occupant" or "state of the occupant") in step S2, the control unit 13 selects an advertisement image based on the information acquired in step S2 (step S3).

More specifically, the control unit 13 determines whether or not the occupant is in one of a "state of large fatigue", "state of large sleepiness", and "state of large stress" based on an captured image by a camera capable of capturing a face image of the occupant seated on the seat 41 or detection information of the sensors constituting the sensor group 31.

The method of determining whether or not it is the "state of large fatigue" based on a face image or information detected by a sensor can employ the methods disclosed in, for example, Japanese Unexamined Patent Publication No. 2019-64407, Japanese Unexamined Patent Publication No. 2011-22211, Japanese Unexamined Patent Publication No. 2018-41238, International Publication No. WO2014/017090. Alternatively, a value indicating the degree of fatigue may be detected by a known technique other than the above. Specifically, for example, a value indicating the degree of fatigue (e.g., fatigue degree) is calculated using the method disclosed in any of the publications, and when the value exceeds a threshold value, it is determined as the "state of large fatigue".

The method of determining whether or not it is the "state of large sleepiness" based on a face image or information detected by a sensor can employ the methods disclosed in, for example, Japanese Unexamined Patent Publication No. 2011-48531, Japanese Unexamined Patent Publication No. 2019-68933, Japanese Unexamined Patent Publication No. 2008-246013, Japanese Unexamined Patent Publication No. 2011-22211. Alternatively, a value indicating the degree of sleepiness may be detected by a known technique other than the above. Specifically, for example, a value indicating the degree of sleepiness is calculated using the method disclosed in any of the publications, and when the value exceeds a threshold value, it is determined as the "state of large sleepiness".

The method of determining whether or not it is the "state of large fatigue" based on a face image or information detected by a sensor can employ the methods disclosed in, for example, Japanese Unexamined Patent Publication No. 2014-8070, International Publication No. WO2014/002418, Japanese Unexamined Patent Publication No. 2018-205794, Japanese Unexamined Patent Publication No. 2011-39601. Alternatively, a value indicating the degree of stress may be detected by a known technique other than the above. Specifically, for example, a value indicating the degree of stress is calculated using the method disclosed in any of the publications, and when the value exceeds a threshold value, it is determined as the "state of large stress".

When determining as one of "state of large fatigue", "state of large sleepiness", and "state of large stress" as a result of performing the determination by such a determination method, the control unit 13 selects an advertisement image associated with the determined state as long as it is not concurrent with the other determinations.

Furthermore, the control unit 13 determines whether or not it is the "state of long seated time" about the occupant seated on the seat 41 based on the detection result of the pressure sensor 51 provided on the seat 41. Specifically, for example, the control unit 13 determines that the occupant seated on the seat 41 is in the "state of long seated time" when the pressure detected by the pressure sensor 51 exceeds a certain value for a certain period of time or longer. Furthermore, the control unit 13 determines that the occupant seated on the seat 41 is in the "state of high blood pressure" when the detection value of the blood pressure sensor that measures the blood pressure of the occupant seated on the seat 41 (blood pressure of the occupant) is a threshold value or more. Moreover, the control unit 13 determines that the occupant seated on the seat 41 is in the "state of small pulse wave" when a maximum value of the pulse wave of the occupant obtained within a certain period of time is smaller than the threshold value based on the detection result of the pulse wave sensor that measures the pulse wave of the occupant seated on the seat 41.

When determining as one of "state of long seated time", "state of high blood pressure", and "state of small pulse wave" as a result of performing the determination by such a determination method, the control unit 13 selects an advertisement image associated with the determined state as long as it is not concurrent with the other determinations.

In the present configuration, the control unit 13 corresponds to an example of an image analyzing unit, and functions to specify the state of the occupant based on an image captured by the camera 19 (imaging unit). Furthermore, the control unit 13 corresponds to an example of a detection result analyzing unit, and functions to specify the state of the occupant based on the detection result by the sensor group 31 (sensor).

Furthermore, the control unit 13 may determine whether the occupant seated on the seat 41 has performed a motion of uttering a keyword classified as any type as a voice based on the voice input to the microphone 17 provided near the seat 41. For example, when the voice input to the microphone 17 includes the keyword 21, it is determined that the "motion of uttering a keyword classified as type 2 as a voice" has been performed. In the present configuration, the control unit 13 functions as an example of a voice analyzing unit, and functions to specify the motion of the occupant based on the voice detected by the microphone 17 (voice detecting unit).

When determining that the "occupant has performed a motion of uttering a keyword classified as any type as a voice" as a result of performing the determination by such a determination method, the control unit 13 selects an advertisement image associated with the relevant type.

Moreover, the control unit 13 may determine whether or not the occupant in the vehicle interior has performed a motion of searching by inputting a keyword classified as any type to the information terminal based on the information transmitted from the information terminal 60. For example, when the search information transmitted from the information terminal 60 includes the keyword A1, it is determined that the "motion of searching by inputting a keyword classified as type A to the information terminal" has been performed. In the present configuration, the control unit 13 corresponds to an example of an information analyzing unit, and functions to specify a motion of an occupant based on the information acquired by the communication unit 37 and the control unit 13 (information acquiring unit).

When determining that "the occupant has performed a motion of searching by inputting a keyword classified to any type to the information terminal", the control unit 13 selects an advertisement image associated with the relevant type.

As a result of the determination performed by the control unit 13 in step S3 as described above, when multiple recognitions are obtained about the state of the occupant or the motion of the occupant (when there are concurrent multiple states or motions of the occupant), any one of states or motions among the concurrent multiple recognitions may be determined randomly or any one of states or motions may be determined according to a predetermined priority. For example, when the "state of large fatigue" and the "motion of searching by inputting a keyword classified as type A to the information terminal" are recognized as a result of performing a determination according to the above-described determination method, either one may be determined randomly or either one with higher priority may be determined. In a case of determining according to the priority, the priority may be defined in advance for each of the plurality of state candidates and the plurality of motion candidates, and the priority order may be set with respect to all the candidates.

After step S3, the control unit 13 displays the advertisement image selected in step S3 at a position associated with the relevant advertisement image (position specified by the position information associated with the advertisement image in the correspondence information) (step S4).

For example, when determining that the state of the occupant is "state of large fatigue" in step S3, the control unit 13 displays one of the advertisement images J1, J2, J3 . . . associated with the "state of large fatigue". Which of the advertisement images J1, J2, J3 . . . to display may be selected randomly, may be selected from the image in which the last displayed time is the oldest, or may be selected in consideration of other conditions. When the advertisement image J1 is selected, the control unit 13 displays the advertisement image J1 at a position specified by the position information J1 associated with the advertisement image J1. The content of the advertisement image J1 is desirably an image of an advertisement for a product or a service that contributes to elimination of the state of the occupant to which the advertisement image J1 is associated (specifically, a state of large fatigue), and in the example of FIG. 9, an advertisement image of a service that contributes to the elimination of fatigue (e.g., a massage business, a chiropractic business, a medical business, etc.) is displayed at a position (display area AR2) specified by the position information J1. The advertisement that contributes to elimination of the "state of large fatigue" may be an advertisement image of a product that contributes to recovery from fatigue (e.g., a massage device, a health food, a medicine, etc.).

Alternatively, when determining that the state of the occupant is the "state of large stress" in step S3, the control unit 13 displays one of the advertisement images L1, L2, L3 . . . associated with the "state of large stress". Which of the advertisement images L1, L2, L3 . . . to display may be selected randomly, may be selected from the image in which the last displayed time is the oldest, or may be selected in consideration of other conditions. When the advertisement image L2 is selected from the plurality of advertisement images L1, L2, L3 . . . , the control unit 13 displays the advertisement image L2 at a position specified by the position information L2 associated with the advertisement image L2. The content of the advertisement image L2 is desirably an image of an advertisement of a product or a service that contributes to elimination of the state of the occupant to which the advertisement image L2 is associated (specifically, a state of large stress), and in the example of FIG. 10, an advertisement image of a service that contributes to stress reduction (e.g., a travel business, a therapy business, a fitness business, etc.) is displayed at a position (display area AR2) specified by the position information L2.

Figure 9:
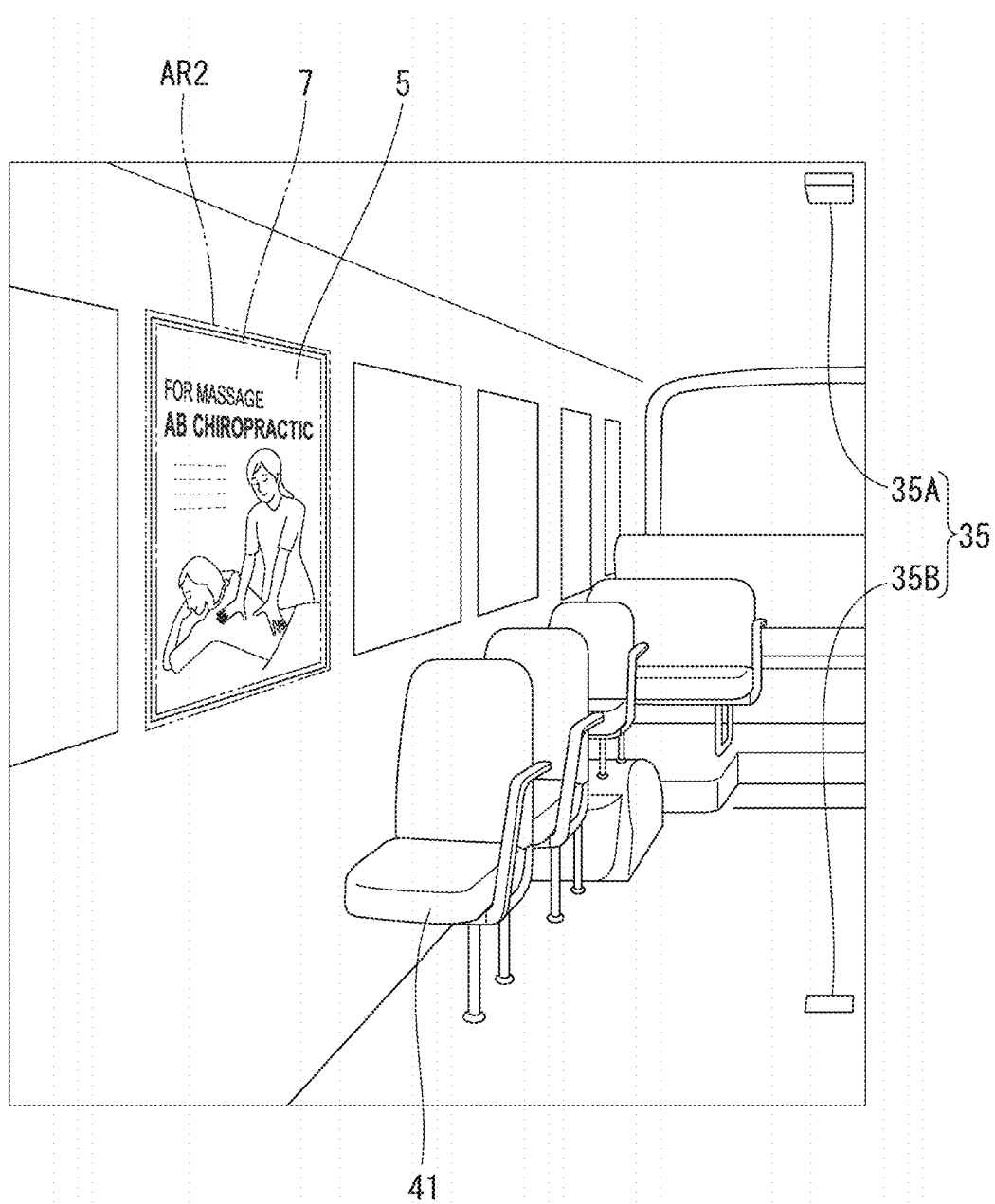
FIG. 9 is an explanatory view describing an example of displaying an advertisement image in a window side display area.
Figure 10:
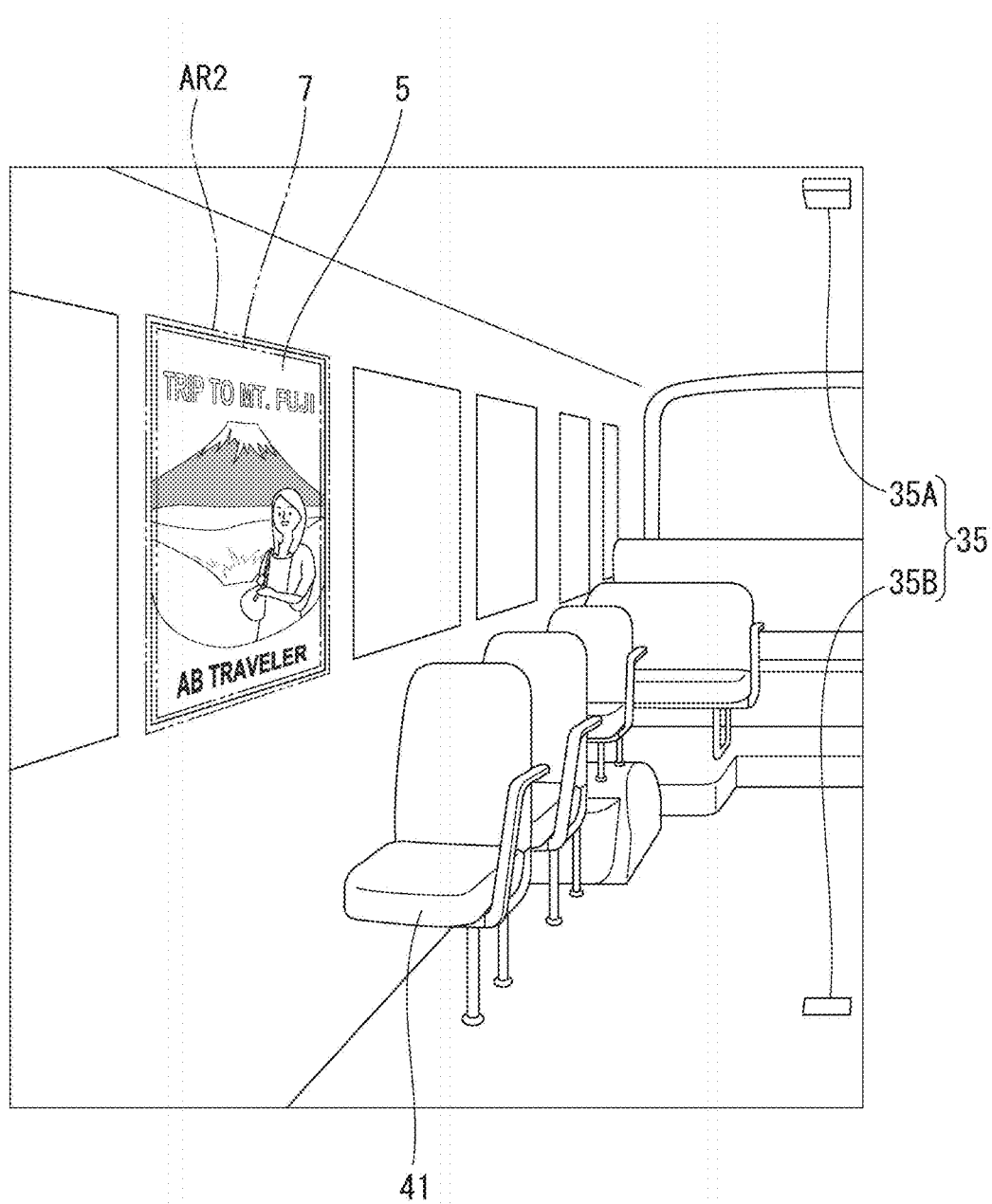
FIG. 10 is an explanatory view describing an example of displaying an advertisement image different from FIG. 9 in the window side display area.

FIGS. 9 and 10 show the images of travel, scenery, interior and the like as examples of advertisement images suitable for display in the display area AR2 (window area), however, other images may be used as long as it is an advertisement image to be displayed in the area AR2.

Figure 11:
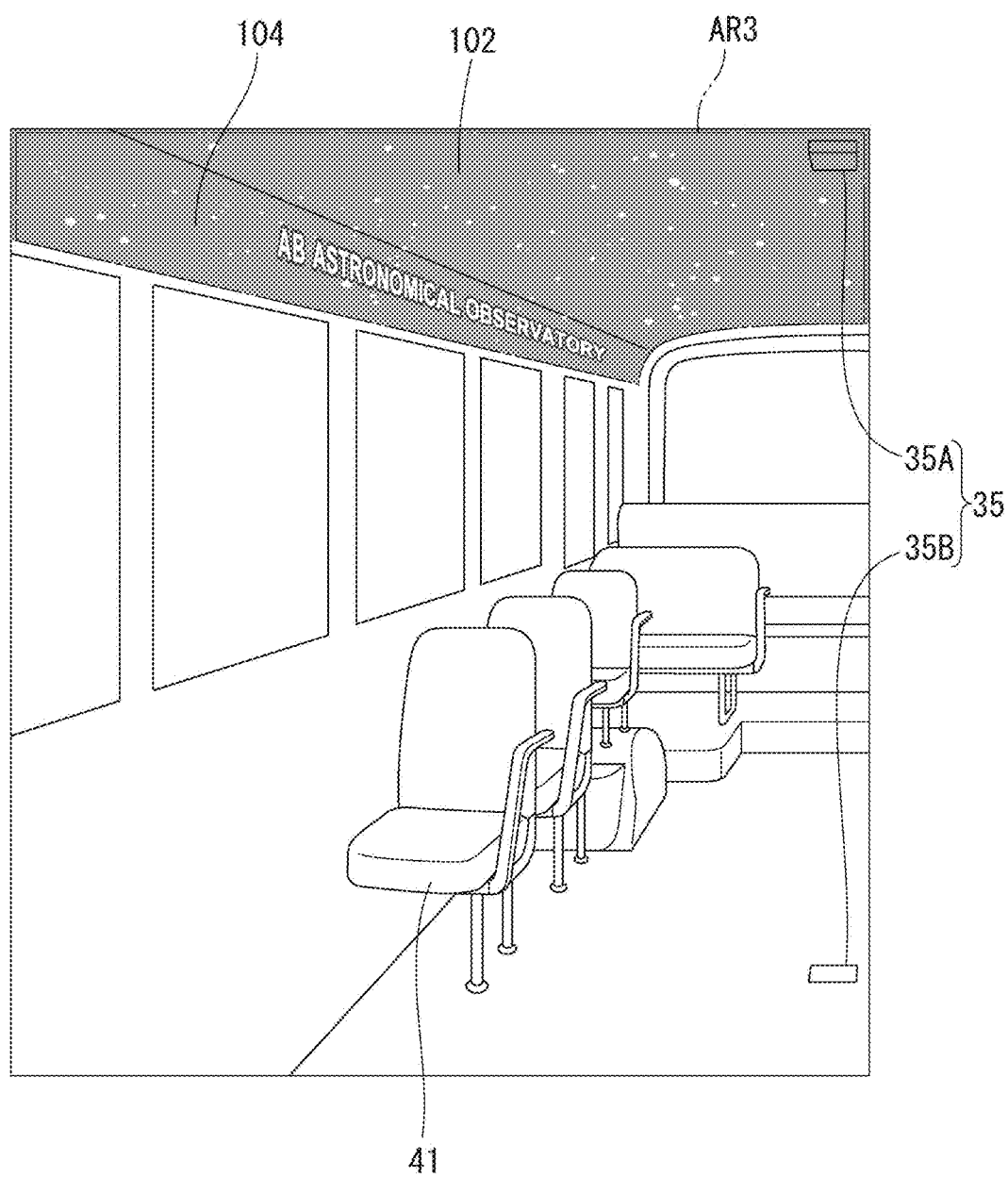
FIG. 11 is an explanatory view describing an example of displaying an advertisement image in an upper display area.

FIG. 11 shows a case in which the advertisement image L3 has been selected (another example), and the advertisement image L3 of a service that contributes to stress reduction (e.g., an astronomical observatory capable of observing constellations, etc.) is displayed at a position (display area AR3) specified by the position information L3. The advertisement that contributes to elimination of the "state of large stress" may be an advertisement image of a product that contributes to stress reduction (e.g., an aroma oil, a sleeping tool, a refreshing device, etc.).

FIG. 11 shows the image of astronomical observatory, starry sky and the like as an example of advertisement images suitable for display in the display area AR3 (area on the upper side of the window), however, other images may be used as long as it is an advertisement image to be displayed in the area AR3, such as an image related to sky.

When determining that the state of the occupant is the "state of long seated time" in step S3, the control unit 13 displays one of the advertisement images M1, M2, M3 . . . associated with the "state of long seated time". Which of the advertisement images M1, M2, M3 . . . to display may be selected randomly, may be selected from the image in which the last displayed time is the oldest, or may be selected in consideration of other conditions. When the advertisement image M1 is selected, the control unit 13 displays the advertisement image M1 at a position specified by the position information M1 associated with the advertisement image M1. The content of the advertisement image M1 is desirably an image of an advertisement of a product or a service suitable for the state of the occupant to which the advertisement image M1 is associated (specifically, state of long seated time), and in the example of FIG. 12, an advertisement image of a service that contributes to elimination of foot fatigue (e.g., footbath, massage, etc.) is displayed at a position (display area AR1) specified by the position information M1.

Figure 13:
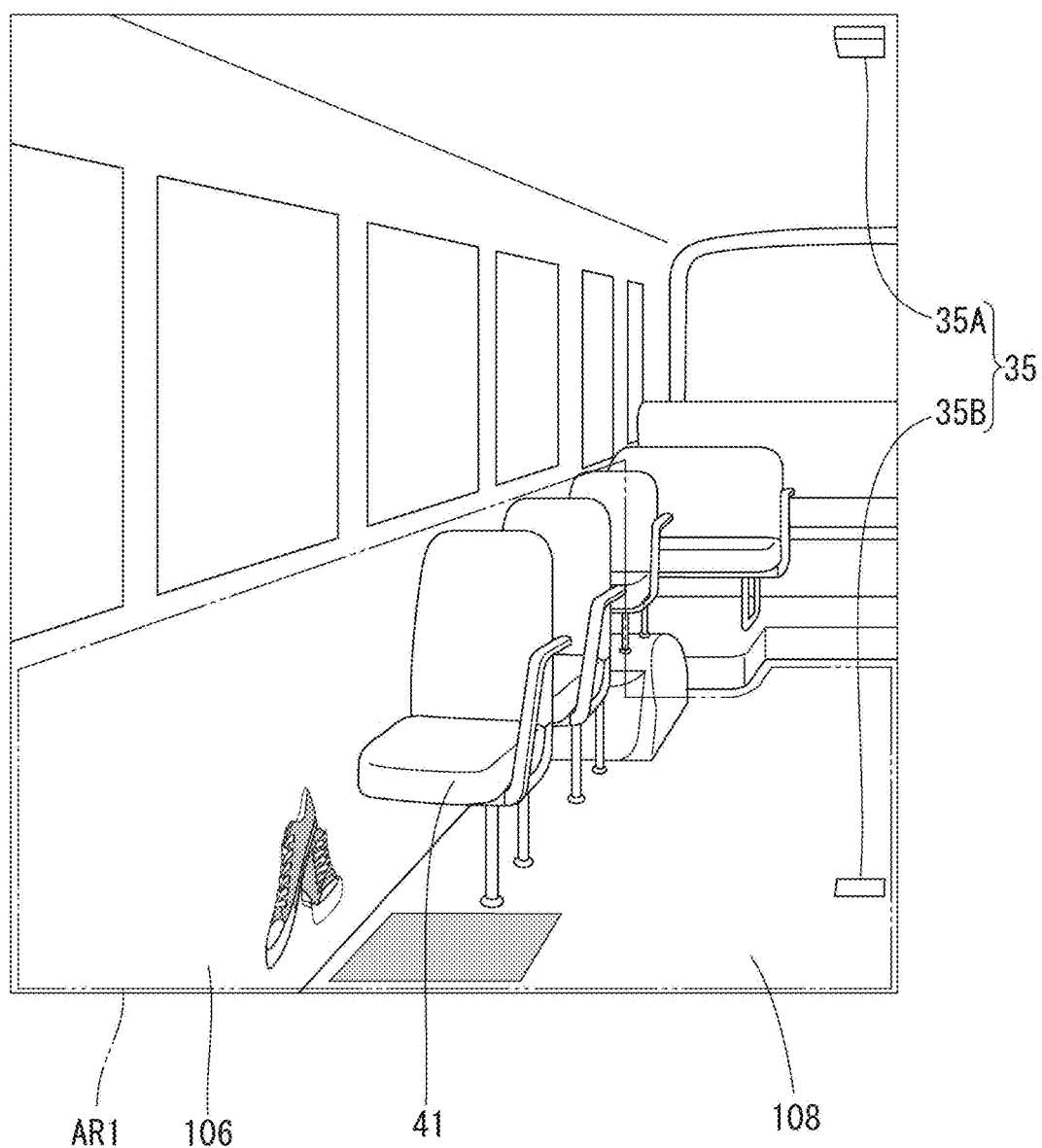
FIG. 13 is an explanatory view describing an example of displaying an advertisement image different from FIG. 12 in the lower display area.

When determining that the "occupant has performed a motion of uttering a keyword classified as type 1 as a voice" in step S3, the control unit 13 displays one of the advertisement images corresponding to type 1 at a position specified by the position information associated with such advertisement image. FIG. 13 shows a specific example of this case. In the example of FIG. 13, the type 1 is a classification related to "footwear", in which related words such as "shoes" and "shoes" are associated as keywords related to footwear, an advertisement image of shoes or shoe store is associated as the advertisement image l1 corresponding to type 1, and the area AR1 is associated as the position information l1 corresponding to the advertisement image l1. In such a case, when the control unit 13 determines in step S3 that the "occupant has performed a motion of uttering a keyword ("shoes") classified as type 1 (footwear) as a voice", for example, the advertisement image l1 corresponding to type 1 (specifically, image of footwear, advertisement image of shoe store, etc.) can be selected, and such advertisement image l1 can be displayed at a position (area AR1) specified by the position information l1 associated with the advertisement image l1 as in the display on the inner wall surface 106 in FIG. 13

Figure 12:
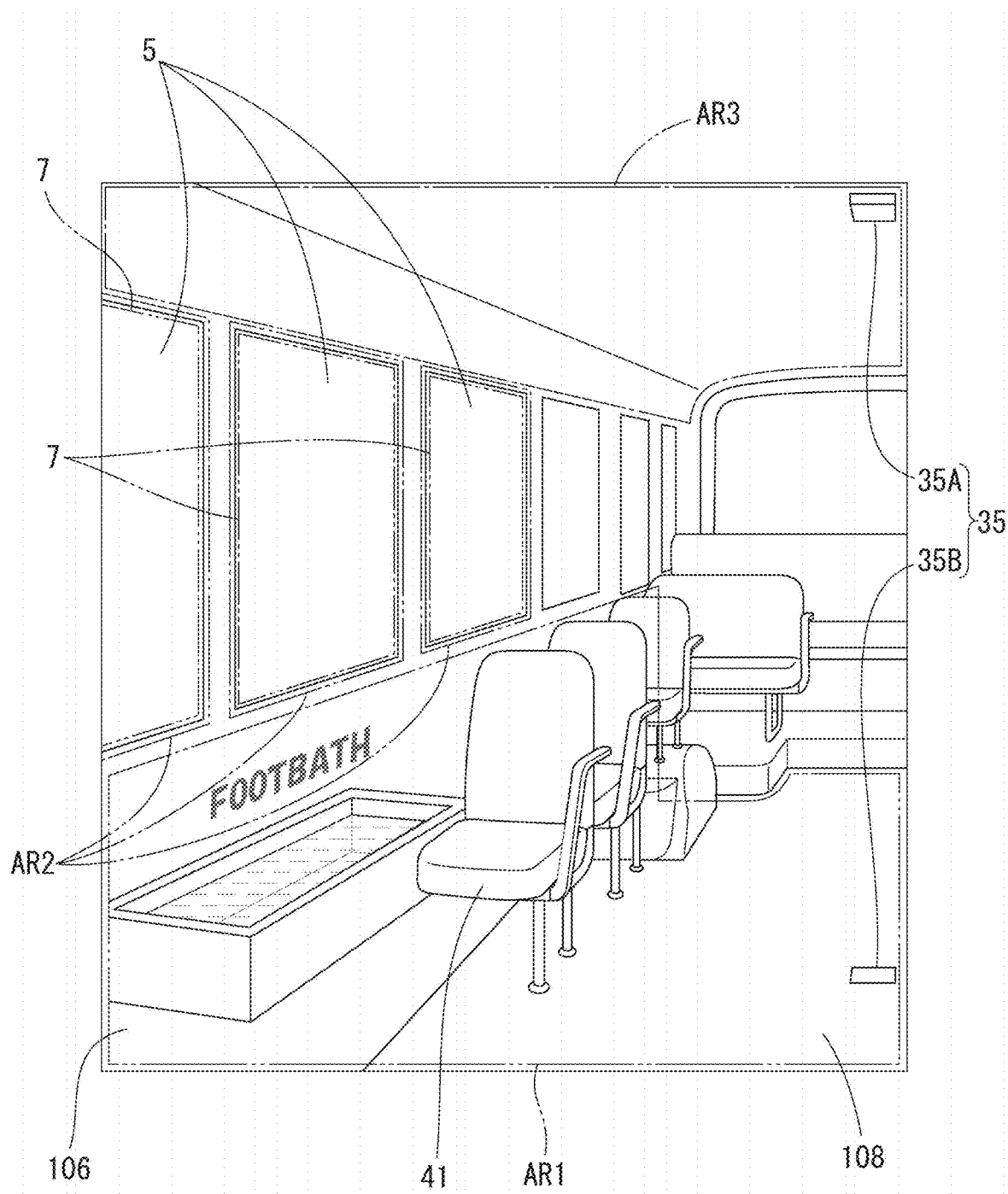
FIG. 12 is an explanatory view describing an example of displaying an advertisement image in a lower display area.

FIGS. 12 and 13 show the image of shoes and the image of a footpath as an example of advertisement images suitable for display in the area AR1 (area on the lower side of the window), however, an image of a carpet, a mat or the like may be used as the advertisement image shown on the floor 108 in FIG. 13. Alternatively, other images related to a floor or the ground may be used.

Figure 14:
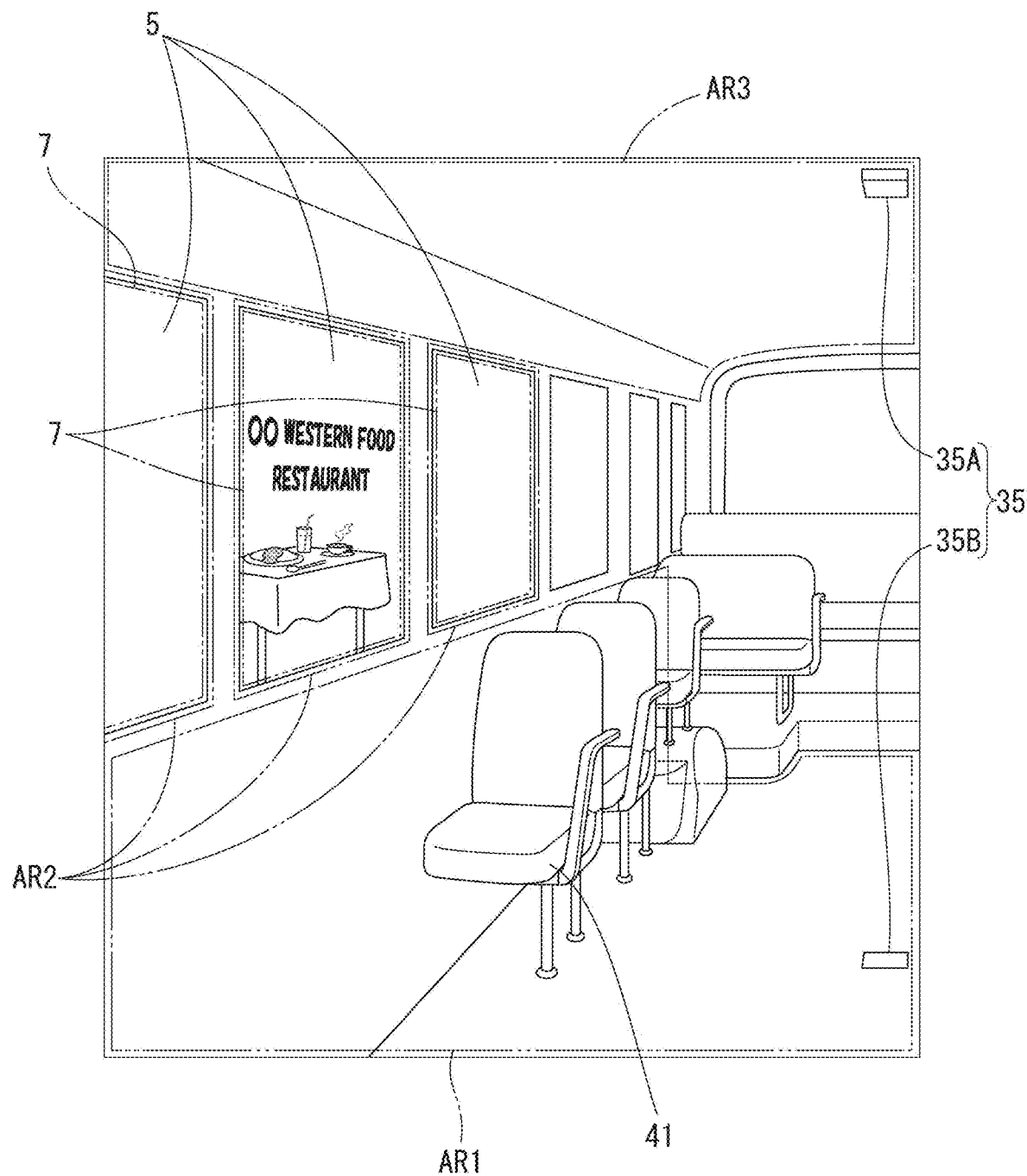
FIG. 14 is an explanatory view describing an example of displaying an advertisement image different from FIGS. 9 and 10 in the window side display area.

When determining that the "occupant has performed a motion of searching for a keyword classified as type A" in step S3, the control unit 13 displays one of the advertisement images corresponding to type A at a position specified by the position information associated with such advertisement image. FIG. 14 shows a specific example of this case. In the example of FIG. 14, type A is a classification related to "food and drink", in which related words such as "Japanese food", "Western food", "Chinese food", and "sake" are associated as a keyword related to food and drink, an advertisement image of "Western food restaurant" is associated as an advertisement image A1 corresponding to type A, and the area AR2 is associated as position information A1 corresponding to the advertisement image A1. In such a case, when the control unit 13 determines that the "occupant has performed a motion of uttering a keyword ("Western food") classified as type A (food and drink) as a voice" in step S3, for example, the advertisement image A1 corresponding to type A (specifically, image of Western food, advertisement image of Western food restaurant, etc.) can be selected, and such advertisement image A1 can be displayed at a position (area AR2) specified by the position information A1 associated with the advertisement image A1 as shown in FIG. 14.

After controlling the display unit 35 to display the advertisement image in step S4 of FIG. 6, the control unit 13 determines in step S5 whether or not the advertisement termination condition is established while maintaining the state in which the advertisement image is displayed. When determining that the advertisement termination condition is established, the control unit 13 terminates the advertisement display control of FIG. 6. When not determining in step S5 that the advertisement termination condition is established, the control unit 13 determines in step S6 whether or not an advertisement update condition is established. When the advertisement update condition is not established, the control unit 13 returns to step S4 and continues to display the advertisement image, and when the advertisement update condition is established, the control unit 13 returns to step S2 and performs again the processes of step S2 and subsequent steps. The advertisement termination condition may be, for example, that a predetermined time has been reached, or that a predetermined operation has been performed on an operation unit (not shown). The advertisement update condition may be, for example, that a certain time has elapsed from the start of the display of the advertisement image currently being displayed, or that the vehicle has left away by a certain distance or more from the point where the display of the advertisement image currently being displayed is started, or may be that a predetermined change has occurred in the weather or temperature (e.g., the temperature has changed by a certain value or more).

As described above, in the vehicle advertisement display system 1 of the present disclosure, the detection unit 11 can detect at least one of the "state of the occupant" and the "motion of the occupant" as a target. Then, the control unit 13 can cause the display unit 35 to display the advertisement image having the advertising content corresponding to the target detected by the detection unit 11, based on the correspondence information that defines the advertising content corresponding to each candidate of the target. In other words, the vehicle advertisement display system 1 described above can display an advertisement image suited to the state of the occupant or the motion of the occupant toward the interior of the vehicle 3, which can increase the possibility that the occupant gets interested in the advertisement.

In the vehicle advertisement display system 1 of the present disclosure, the correspondence information includes position information in which the display position in the interior of the vehicle is defined in association with each of the advertising contents. The control unit 13 controls the display unit 35 to display an advertisement image having the advertising content corresponding to the target detected by the detection unit 11 at the position corresponding to the advertising content based on the position information. With this configuration, not only the advertisement image having the content suited to the occupant can be displayed, but also the advertisement image can be displayed at a position suited to the content of the advertisement image. Therefore, the advertising effect can be enhanced by devising display positions.

The detection unit 11 includes the imaging unit (the camera 19) that images the occupant, and the image analyzing unit (the control unit 13) that specifies the state of the occupant based on the image captured by the imaging unit (the camera 19). With this configuration, the state of the occupant can be specified based on the captured image of the occupant. Accordingly, an advertisement image suited to the state of the occupant can be easily displayed without imposing an excessive burden on the occupant.

The detection unit 11 includes the sensor (the sensor group 31) that senses the body of the occupant, and the detection result analyzing unit (the control unit 13) that specifies the state of the occupant based on the detection result of the sensor (the sensor group 31). With this configuration, the state of the occupant can be specified based on the detection result when the occupant's body is sensed by the sensor. Accordingly, an advertisement image suited to the state of the occupant can be easily displayed without imposing an excessive burden on the occupant.

The detection unit 11 includes the voice detecting unit (the microphone 17) that detects a voice uttered by the occupant, and the voice analyzing unit (the control unit 13) that specifies the motion of the occupant based on the voice detected by the voice detecting unit (the microphone 17). With this configuration, the motion of the occupant can be specified by the voice uttered by the occupant. Accordingly, an advertisement image suited to the motion of the occupant can be easily displayed without imposing an excessive burden on the occupant.

The detection unit 11 includes the information acquiring unit (the communication unit 37 and the control unit 13) that acquires information on the operation content when the occupant operates the information terminal 60, and the information analyzing unit (the control unit 13) that specifies the motion of the occupant based on the information acquired by the information acquiring unit (the communication unit 37 and the control unit 13). With this configuration, the motion of the occupant can be specified based on the information on the operation content when the occupant operates the information terminal 60. Accordingly, an advertisement image suited to the motion of the occupant can be easily displayed without imposing an excessive burden on the occupant. Furthermore, since the information personally operated by the occupant can be taken into account, an advertisement image that matches more the occupant's interest can be easily displayed.

The examples described above or below are merely for illustrative purposes only and are not to be construed as limiting the present disclosure. Although the present disclosure has been described with reference to exemplary embodiments, it is to be understood that the language used in the description and the illustration of the present disclosure is descriptive and illustrative and not restrictive. As set forth herein, modifications may be made within the scope of the appended Claims without deviating from the scope or essence of the present disclosure in its form. Although reference has been made herein to specific structures, materials and examples in the detailed description of the present disclosure, it is not intended to limit the present disclosure to the disclosed matters herein, but rather the present disclosure is to cover all functionally equivalent structures, methods, and uses within the scope of the appended Claims.

The first disclosure is not limited to the embodiment described in detail above, and various modifications or changes can be made within the scope defined in the Claims.

(1) in the embodiment described above, the detection unit 11 detects the "state of the occupant" and the "motion of the occupant", but may be configured to detect only one of the "state of the occupant" or the "motion of the occupant".

(2) In the embodiment described above, an example in which the display unit 35 is constituted of the projector has been described, but the display unit may be a display device arranged in a part of or all of the areas AR1, AR2, and AR3. As the display device, various known display devices such as a liquid crystal display device, an organic EL display device, and electronic paper can be used.

(3) In the embodiment described above, the display unit is configured to be able to display the advertisement image in any of the three areas, but the target area for displaying the advertisement image may be subdivided into four or more, or two.

(4) In the embodiment described above, the advertisement image is determined based on four elements, the face image of the occupant captured by the camera 19, the voice from the occupant acquired by the microphone 17, the sensing result of the body of the occupant detected by the sensor group 31, and the information from the information terminal 60 acquired through the communication unit 37. However, any one or a plurality of detection functions may not be provided. For example, the advertisement image may be determined based only on the face image of the occupant captured by the camera 19, or the advertisement image may be determined based only on the voice from the occupant acquired by the microphone 17 and the sensing result of the body of the occupant detected by the sensor group 31 (two elements). Alternatively, a function of detecting other elements, not only the four elements, may be added.

(5) In the embodiment described above, an example in which the state is determined based on the face image of the occupant has been described. An example of determining the state of the face is not limited to the method described above, but may be determined by the color of the face of the occupant. For example, when the color of the face of the occupant specified in the face image is the first color, the state of the occupant may be determined to be in the first state, and the first advertisement image associated with the first state may be displayed. Similarly, when the color of the face of the occupant specified in the face image is the second color, the state of the occupant may be determined to be in the second state, and the second advertisement image associated with the second state may be displayed.

(6) In the embodiment described above, an example of detecting the terminal operation by the occupant or the voice of the occupant has been described as a method of detecting the motion of the occupant, but other motions may be employed. For example, a motion in which an occupant yawns, a motion in which an occupant blows his nose, or a motion in which an occupant blinks may be detected as a gesture. In this case, when any motion (gesture etc.) is detected, an advertisement image associated with such motion may be displayed at a position associated with the advertisement image.

(7) In the embodiment described above, a bus is exemplified as a vehicle, but other vehicles may be used as long as they can move with a person on them. For example, it may be an aircraft, a train, a ship, or the like.

Regarding Second Disclosure

1. Outline of Vehicle Advertisement Display System 201

Figure 15:
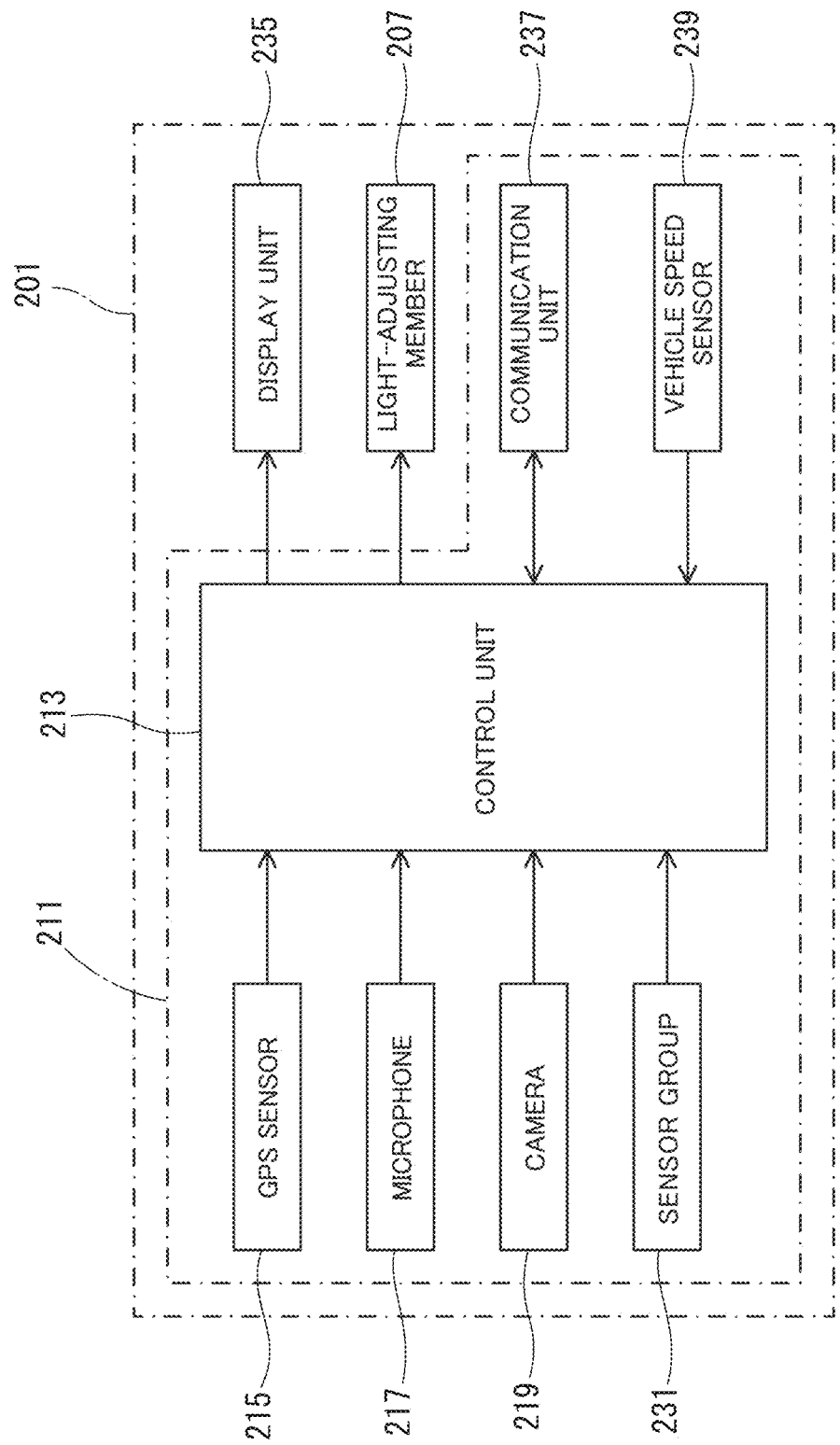
FIG. 15 is a block diagram conceptually showing the overall configuration of a vehicle advertisement display system 201.
Figure 16:
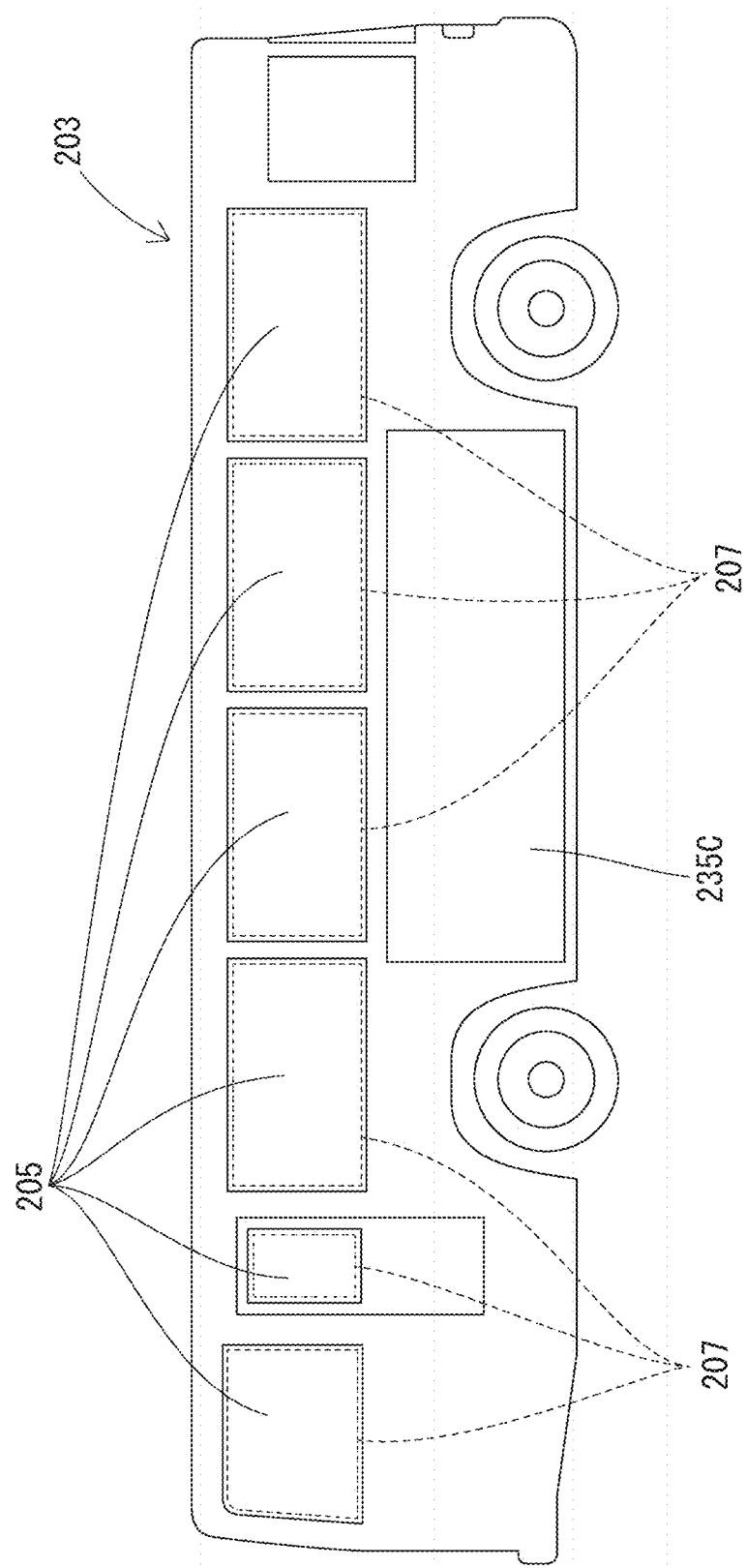
FIG. 16 is a conceptual view conceptually showing a vehicle 203 on which the vehicle advertisement display system 201 is mounted.
Figure 17:
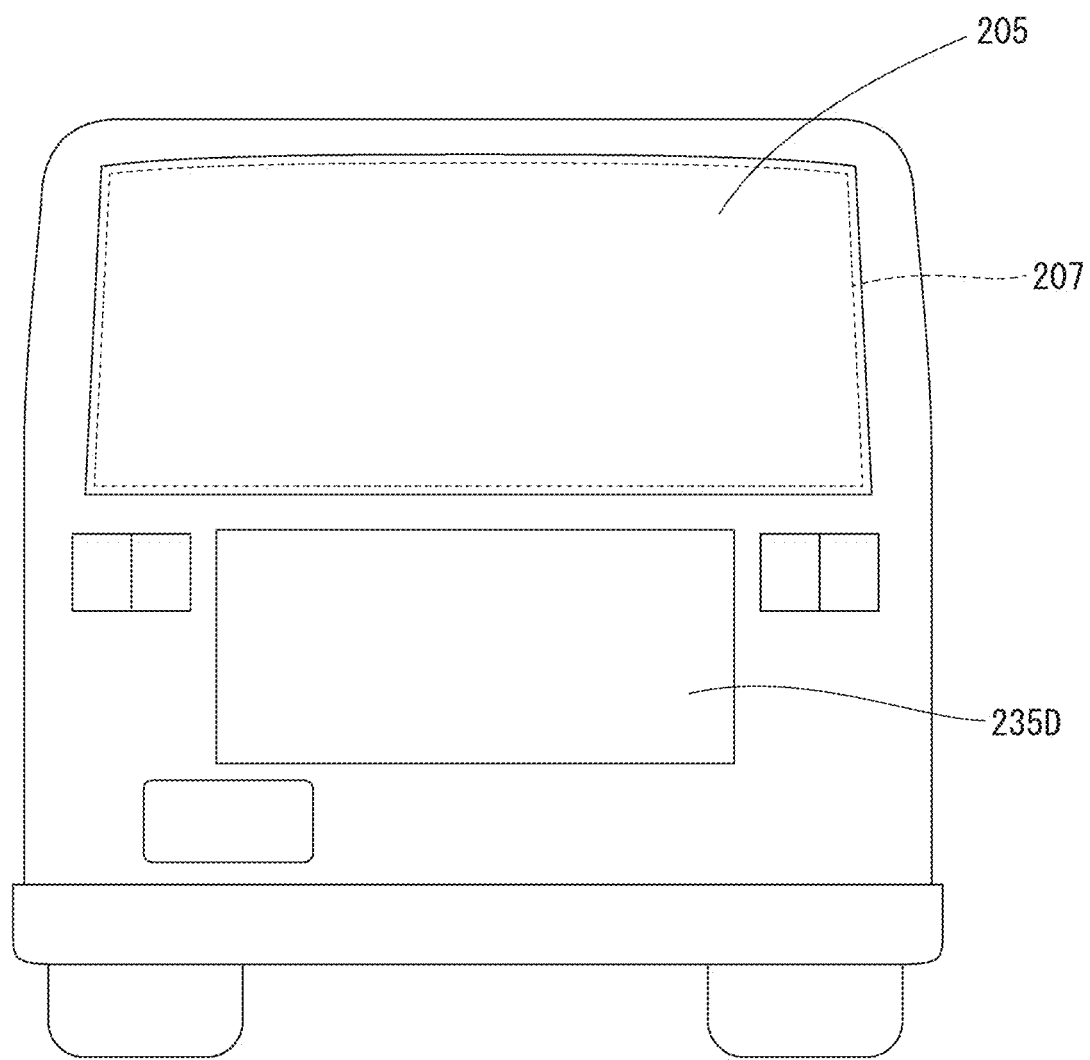
FIG. 17 is a conceptual view showing an outer appearance of the vehicle 203 from a direction different from FIG. 16.
Figure 18:
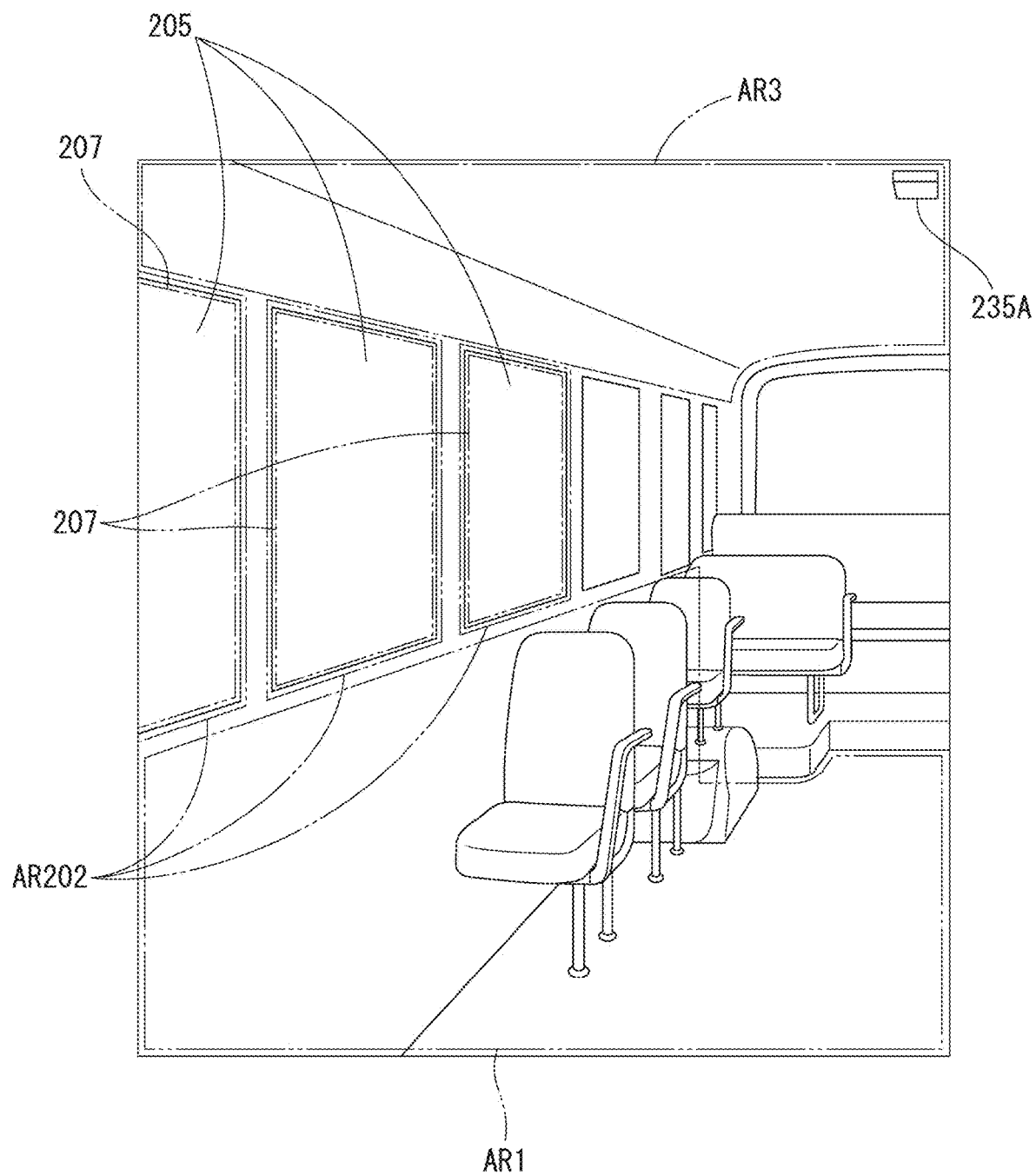
FIG. 18 is a conceptual view conceptually showing a state of an interior of the vehicle 203.

An embodiment of a vehicle advertisement display system 201 (hereinafter, also simply referred to as a system 201) of the present disclosure will be described in detail with reference to the drawings. FIG. 15 is a block diagram conceptually showing the vehicle advertisement display system 201. FIG. 16 is an explanatory diagram showing a vehicle 203 (bus) from the side, on which the vehicle advertisement display system 201 is mounted. FIG. 17 is an explanatory view showing the vehicle 203 from behind. FIG. 18 is an explanatory view showing the interior of the vehicle 203.

The system 201 is a system that is mounted on the vehicle 203 as shown in FIG. 16, and that can perform advertisement directed toward the exterior or the interior of the vehicle 203. The system 201 includes a display unit 235 that displays, toward the exterior of the vehicle 203, an image that can be visually recognized outside the vehicle, a light-adjusting member 207 arranged in an incident portion 205 (FIGS. 16 to 18) which an external light enters, and a control unit 213 (ECU (Electronic Control Unit)). Furthermore, the system 201 includes a GPS sensor 215, a microphone 217, a camera 219, an environment sensor group 231 (hereinafter, also referred to as a sensor group 231), and a vehicle speed sensor 239.

The control unit 213 includes a CPU (Central Processing Unit), a memory (e.g., a ROM (Read Only Memory), a RAM (Random Access Memory)), and the like. The control unit 213 corresponds to an example of a light-adjusting control unit, is configured to be able to communicate with the light-adjusting member 207 and the display unit 235 by wired communication or wireless communication, and has a function of controlling the transmittance of the light-adjusting member 207 and a function of controlling the display content of the display unit 235. Furthermore, the control unit 213 is configured to be able to communicate with the GPS sensor 215, the microphone 217, the camera 219, the sensor group 231, and the vehicle speed sensor 239 by wired communication or wireless communication, and to be able to acquire information therefrom. In the example of FIG. 15, information from the GPS sensor 215, the microphone 217, the camera 219, the sensor group 231, and the vehicle speed sensor 239 (vehicle speed information) can be directly input to the system 201, but such information may be input to the system 201 through another device. Although illustration is omitted, an operation input unit such as an operation key and an operation button for accepting an operation from an occupant such as a driver may also be provided, and in this case, information corresponding to an operation on the operation input unit is input to the control unit 213.

The incident portion 205 is, for example, a transparent plate section that separates the interior and the exterior of the vehicle 203, and configured as, for example, a window glass capable of closing an opening of a window frame. In the examples of FIGS. 16 and 18, a plurality of incident portions 205 are provided on the side surface of the vehicle 203, and the incident portion 205 is also provided on the back surface of the vehicle 203.

Figure 19:
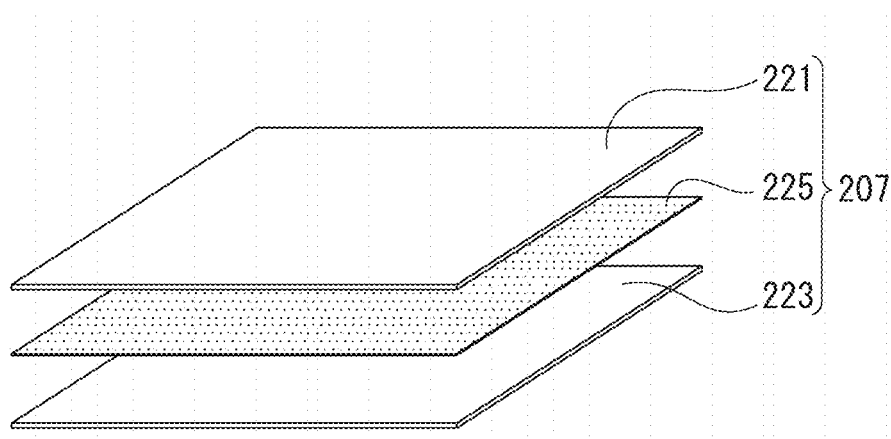
FIG. 19 is an exploded perspective view showing a light-adjusting member 207.
Figure 20:
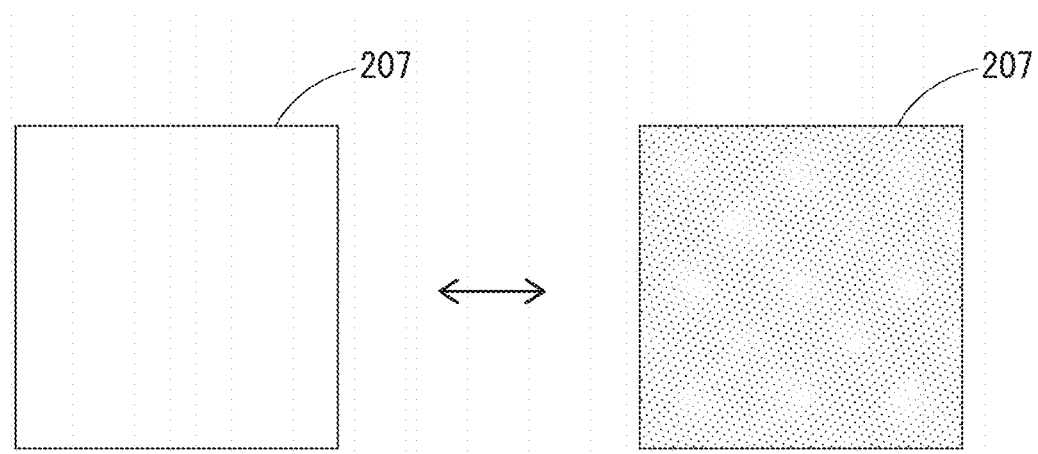
FIG. 20 is an explanatory view showing a change in transmittance of the light-adjusting member 207.

The light-adjusting member 207 is provided at each of the incident portions 205. The light-adjusting member 207 may be attached from the vehicle exterior side, or may be sandwiched between glass plates of the laminated glass of each window by way of an intermediate film. FIG. 19 schematically shows an example of the light-adjusting member 207. As shown in FIG. 19, in the light-adjusting member 207, a light-adjusting film 225 is disposed between a first electrode 221 and a second electrode 223, and the transmittance is changed by a voltage applied in between the first electrode 221 and the second electrode 223. For example, the light-adjusting member 207 becomes transparent or high transmittance when voltage is applied as shown in the left figure of FIG. 20, and becomes opaque or low transmittance when no voltage is applied as shown in the right figure of FIG. 20. FIGS. 19 and 20 simply show an example of the light-adjusting member 207. The shape of the light-adjusting member 207 arranged in each of the incident portions 205 can be set according to the shape of the incident portion 205.

As the light-adjusting film 225, there is suitably exemplified (1) a light-adjusting film 225 using an EC (Electro Chromic) method, (2) a light-adjusting film 225 using an SPD (Suspended Particle Device) method, (3) a light-adjusting film 225 using liquid crystals of VA (Vertical Alignment) method, TN (Twisted Nematic) method or IPS (In-Place-Switching) method.

The light-adjusting film 225 using the EC method has a structure in which a light-adjusting layer (electrolyte layer) is sandwiched between a pair of electrodes. The color of the light-adjusting layer changes between transparent and dark blue according to the potential difference between the electrodes using the oxidation-reduction reaction.

The light-adjusting film 225 using the SPD method is usually colored dark blue using the orientation of fine particles, but changes to transparent when voltage is applied, and returns to the original dark blue when the voltage is turned off. Thus, light and shade can be adjusted by the voltage.

Further, the light-adjusting film 225 using a PDLC (Polymer Dispersed Liquid Crystal) method may be used. The light-adjusting film 25 using the PDLC method has a network structure made of a special polymer formed in the liquid crystal layer, wherein a state in which an array of liquid crystal molecules is irregular is induced by the action of the polymer network, so that light is scattered. When a voltage is applied to array the liquid crystal molecules in the direction of the electric field, light is not scattered so that a transparent state is obtained.

The control unit 213 has a function of controlling the transmittance of the light-adjusting member 207. The control unit 213 determines a member that shields light and a member that does not shield light among the plurality of light-adjusting members 207, and adjusts the transmittance of the member that shields light at least. When the transmittance of each light-adjusting member 207 is adjusted in two stages, the transmittance of the member that shields light is adjusted within a first range, and the transmittance of the member that does not shield light is adjusted within a second range. For example, the transmittance of visible light (e.g., wavelength of 380 nm to 750 nm) of the member that shields light is adjusted to be within the first range (e.g., 0 to 30%), and the transmittance of visible light of the member that does not shield light is adjusted to be within the second range (e.g., 70 to 100%). When the adjustment is thus performed in two stages, the first range, which is the transmittance of the visible light of the member that shields light, is smaller than the second range, which is the transmittance of the visible light of the member that does not shield light (first range second range). The above-described adjustment performed in two stages is merely an example, and the transmittance of the member that does not shield light may be changed in multi-stages of two or more stages, or continuously, by changing the potential difference between the electrodes.

The term "shielding light" as used in the present specification means not only completely shielding light but also weakening the transmission of light (specifically, suppressing the transmittance of light to less than a reference transmittance (e.g., transmittance of the second range)).

In the following description, an example in which the light-adjusting member 207 has a low transmittance (e.g., a translucent state) at the time of no-application (at the time when light is shielded) where no voltage is applied between the first electrode 221 and the second electrode 223 will be described as a representative example.

The display unit 235 includes a first display device 35A (hereinafter also referred to as display device 235A) that performs display with the window as a display position as shown in FIG. 18, and second display devices 235C, 235D (hereinafter respectively referred to as display device 235C and display device 235D) arranged on an outer wall portion of the vehicle 203 as shown in FIGS. 16 and 17. The first display device 235A is constituted of, for example, one or more projectors, and can display various images on a plurality of display areas AR202 in the interior of the vehicle 203. The display area AR202 is an area of each window (area where a transparent plate (glass etc.) is arranged when the window is closed) and an area where each light-adjusting member 207 is arranged when each window is closed. The second display devices 235C and 235D are constituted as a liquid crystal display, an organic EL display, other display devices, or the like, and can display an image toward the outside of the vehicle 203.

The communication unit 237 includes one or more communication devices capable of communicating with an external device (not shown) by wired communication or wireless communication. The control unit 213 communicates with an external device in cooperation with the communication unit 237, and is configured to acquire information of the weather at the current position specified by the GPS sensor 215 from a site providing weather information and other servers. Furthermore, the control unit 213 is configured to cooperate with the communication unit 237 to acquire calendar information, current time information, and the like. Therefore, the control unit 213 can recognize the weather at the current position of the vehicle 203 specified by the GPS sensor 215, and can also recognize the current date, time, and the like from the program incorporated in the control unit itself or the information externally acquired.

The GPS sensor 215 is constituted of a known GPS receiver, and is configured to receive information from a GPS satellite (not shown), and calculate the current position (detailed latitude and longitude) of the vehicle 203 provided with the GPS sensor 215. The GPS sensor 215 may be of any known type as long as the GPS sensor 215 can grasp the current position of the vehicle 203 based on information from the GPS satellite.

The microphone 217 has a function of converting the sound in the interior of the vehicle 203 into an electric signal. The camera 219 is constituted of an imaging unit that images the interior of the vehicle 203.

The environment sensor group 231 has, for example, a plurality of types of sensors. Specifically, a first temperature sensor (outside air temperature sensor) that detects the temperature (outside air temperature) outside the vehicle 203, a second temperature sensor that detects the temperature inside the vehicle 203, a first humidity sensor that detects the humidity outside the vehicle 203, a second humidity sensor that detects the humidity inside the vehicle 203, a raindrop sensor, and the like. The vehicle speed sensor 239 is a sensor that detects the speed of the vehicle 203.

In the present specification, the occupant is a general term for a person riding the vehicle 203, and the type of person is irrelevant. For example, the occupant may be a passenger riding the vehicle 203 or may be a person engaged in a job in the vehicle 203.

2. Advertisement Display Control

Next, the advertisement display control performed by the system 201 will be described.

Figure 21:
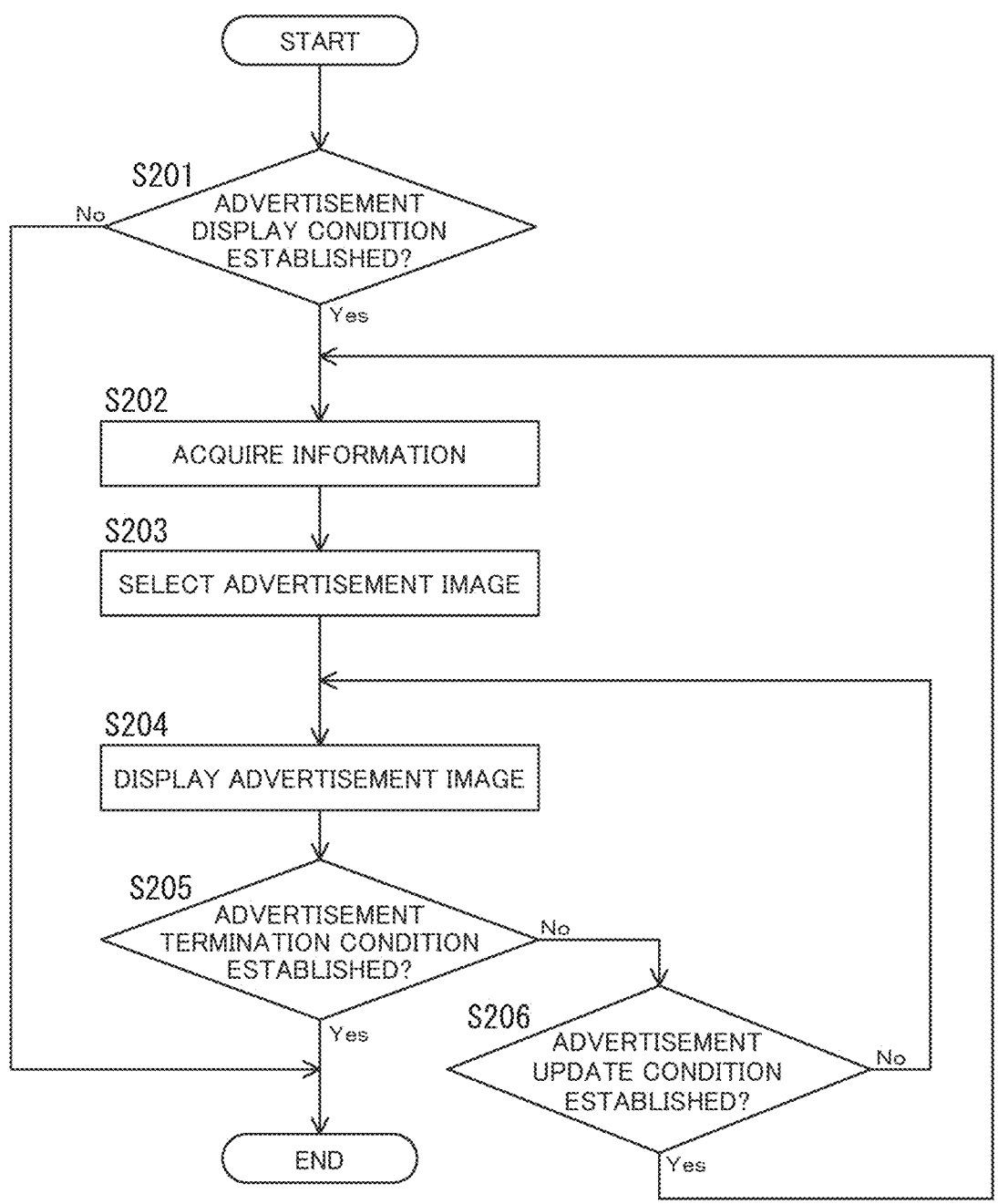
FIG. 21 is a flowchart showing a flow of advertisement display control performed in the vehicle advertisement display system 201.

The advertisement display control shown in FIG. 21 is started by the control unit 213, for example, in response to establishment of a predetermined start condition and repeatedly executed by the control unit 213. The condition (start condition) for starting the advertisement display control in FIG. 21 may be, for example, that power supply to the control unit 213 shown in FIG. 15 has started, or that a predetermined operation has been performed on an operation unit (not shown) and information corresponding to the predetermined operation has been input to the control unit 213. Alternatively, other start conditions may be used.

With the start of the advertisement display control shown in FIG. 21, the control unit 213 determines whether or not the advertisement display condition is established in step S201. The advertisement display condition may be, for example, that an operation of instructing advertisement display to an operation unit (not shown) has been performed, or that a time condition defined in advance has been established (e.g., a time slot in which an advertisement is to be displayed has been reached), or may be other conditions.

When determining that the advertisement display condition is not established in step S201, the control unit 213 determines as "No" in step S201, and ends the advertisement display control shown in FIG. 21. In a case where it is determined as "No" in step S201 or "Yes" in step S205 so that the advertisement display control shown in FIG. 21 is ended, the control unit 213 repeats the advertisement display control so as to start again the advertisement display control of FIG. 21 after a predetermined time from the end of the advertisement display control.

When determining that the advertisement display condition is established in step S201, the control unit 213 determines as "Yes" in step S201 and acquires information in step S202. Specifically, the control unit 213 functions as the information acquiring unit 211 in cooperation with other sensors and the like, and acquires in step S202 the position information of the vehicle 203, the information on the traveling state of the vehicle 203, the environmental information on the inside or the outside of the vehicle 203. Specifically, as shown in FIG. 15, the control unit 213, the GPS sensor 215, the microphone 217, the camera 219, the sensor group 231, the communication unit 237, and the vehicle speed sensor 239 function as the information acquiring unit 211. The "position information" acquired by the information acquiring unit 211 is information on the current position of the vehicle 203, and specifically, GPS information (information that can specify the latitude and longitude of the current position of the vehicle 203) detected by the GPS sensor 215 at the time point of step S202. The "information on the traveling state of the vehicle 203" acquired by the information acquiring unit 211 is, specifically, the speed information of the vehicle 203, and specifically, the speed of the vehicle 203 detected by the vehicle speed sensor 239 at the time point of step S202. The "environmental information" acquired by the information acquiring unit 211 includes the weather at the current position of the vehicle 203, the temperature (temperature) outside the vehicle 203, the humidity outside the vehicle 203, and the like, and also includes information such as current date and time (at the time point of step S202).

After step S202, the control unit 213 selects an advertisement image in step S203. Specifically, correspondence information as shown in FIG. 22 is stored in a storage unit (not shown), and a plurality of advertisement image candidates are prepared. The position of the advertisement target of each advertisement image (position of store, position of facility, etc.), the environmental condition (conditions such as weather, temperature, humidity, etc.), the timing condition (conditions such as time, date, season, etc.), and the traveling state condition (conditions such as "speed range", "frequency of brake", "rotation speed") are associated in association with each candidate (each advertisement image). When performing the process of step S203, the control unit 213 refers to such correspondence information, and selects an advertisement image in which the distance from the current position of the vehicle 203 to the position of the advertisement target is within a certain distance and which meets all the conditions (all of environmental conditions, timing conditions, and traveling state associated with the advertisement image) at the time point of step S203. When there are multiple advertisement images in which the distance from the current position of the vehicle 203 to the position of the advertisement target is within a certain distance and which meets all the conditions, any one of the advertisement images may be selected at random, an advertisement image in which the position of the advertisement target is the closest to the current position among the multiple advertisement images may be selected, or an advertisement image may be selected through other selecting methods.

Here, a description will be specifically made with reference to a specific example shown in FIG. 23.

FIG. 23 embodies the correspondence information shown in FIG. 22, and embodies, specifically, the environmental conditions, timing, traveling state and the like. In FIG. 23, the item "none" means that the condition is not set for the item (i.e., the condition of the item is unconditionally satisfied).

For example, when the season is winter and only the position 3 of the plurality of advertisement target positions is within a certain distance from the current position of the vehicle 203 at the time point of step S203, only the advertisement image 3 corresponds to the "advertisement image in which the distance from the current position of the vehicle 203 to the position of the advertisement target is within a certain distance and which meets all the conditions (all of the environmental conditions, timing conditions, and traveling state associated with the advertisement image) at the time point of step S203". In such a case, the advertisement image 3 is selected in step S203, and the advertisement image 3 is displayed in step S204. The advertisement image 3 is an image related to the position 3 in winter, and is, for example, an advertisement image of "∘∘ ski resort" as displayed on the window in FIG. 24. Alternatively, it may be an advertisement image of skiing gears as displayed on the display device 235C in FIG. 24.

Figure 24:
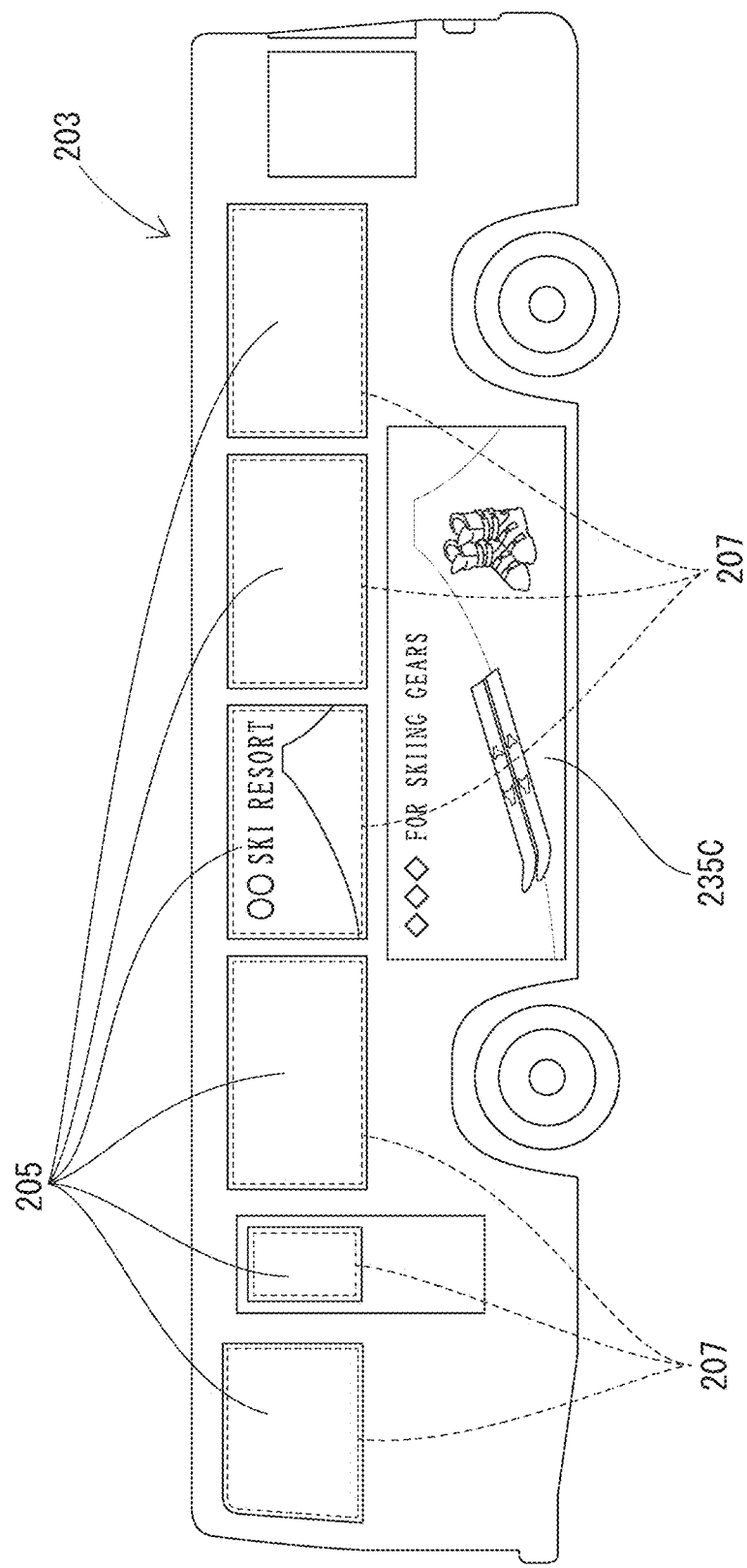
FIG. 24 is an explanatory view showing an example of an advertisement display toward the outside of the vehicle 203.

In the example of FIG. 24, the control unit 213 displays the advertisement image 3 (advertisement image of "∘∘ ski resort") through the incident portion 205 (specifically, a transparent plate glass etc.) arranged on a window) which an external light enters. Such display is carried out in the following manner.

Figure 25:
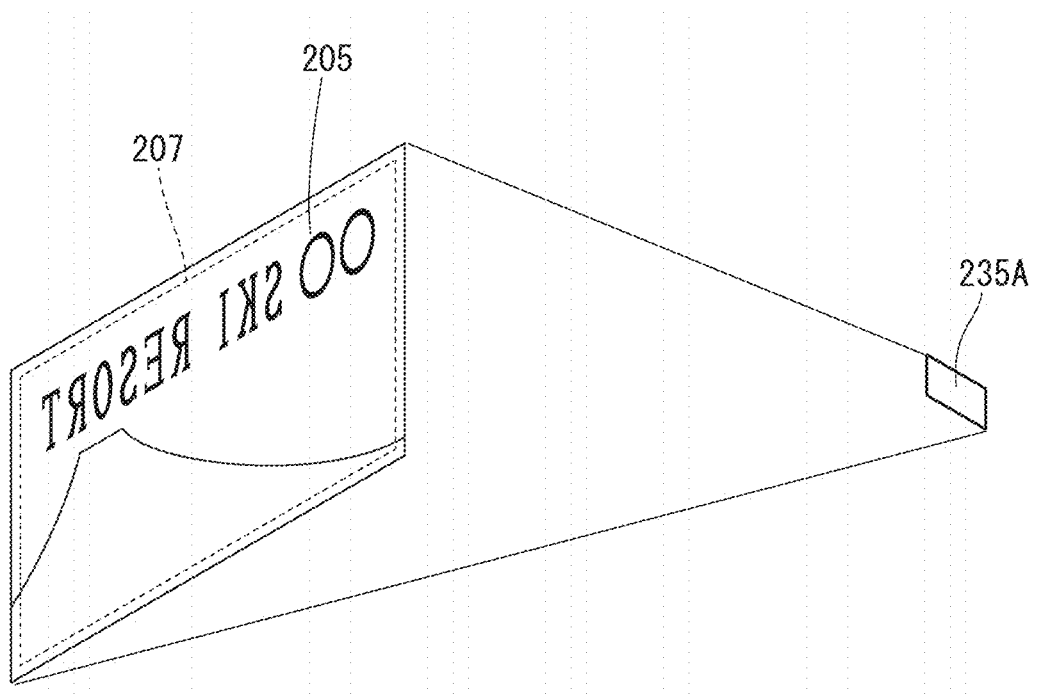
FIG. 25 is an explanatory view showing a display method in the interior when advertisement is performed through a window.

In this configuration, the control unit 213 corresponding to an example of the light-adjusting control unit controls the transmittance of the light-adjusting member, and specifically, switches the light-adjusting member 207 between a state of first transmittance (state of the transmittance within the second range described above) and a state of the second transmittance (state of the transmittance within the first range described above) smaller than the first transmittance. Then, when the predetermined condition is established (specifically, when an advertisement image is displayed in any one of the incident portions 205 in step S204), the control unit 213 (light-adjusting control unit) switches the light-adjusting member 207 arranged in the incident portion 205 to the state of the second transmittance (state in which the transmittance is relatively low), and the control unit 213 (display control unit) displays the advertisement image on the light-adjusting member 207 as shown in FIG. 25 in a state in which the light-adjusting member 207 has been switched to the state of the second transmittance. In the example of FIG. 25, a reversed image (image that is obtained by reversing a image visually recognized when viewed from the outside of the vehicle 203 as shown in FIG. 24) of the advertisement image is displayed on the surface on the inner side (interior side) of the vehicle 203 in the incident portion 205 (specifically, surface on the interior side of the light-adjusting member 207 in a translucent state). When such incident portion 205 and the light-adjusting member 207 are viewed from the outer side, a normal image (regular image) of the advertisement image appears as shown in the display of the window in FIG. 24.

Figure 26:
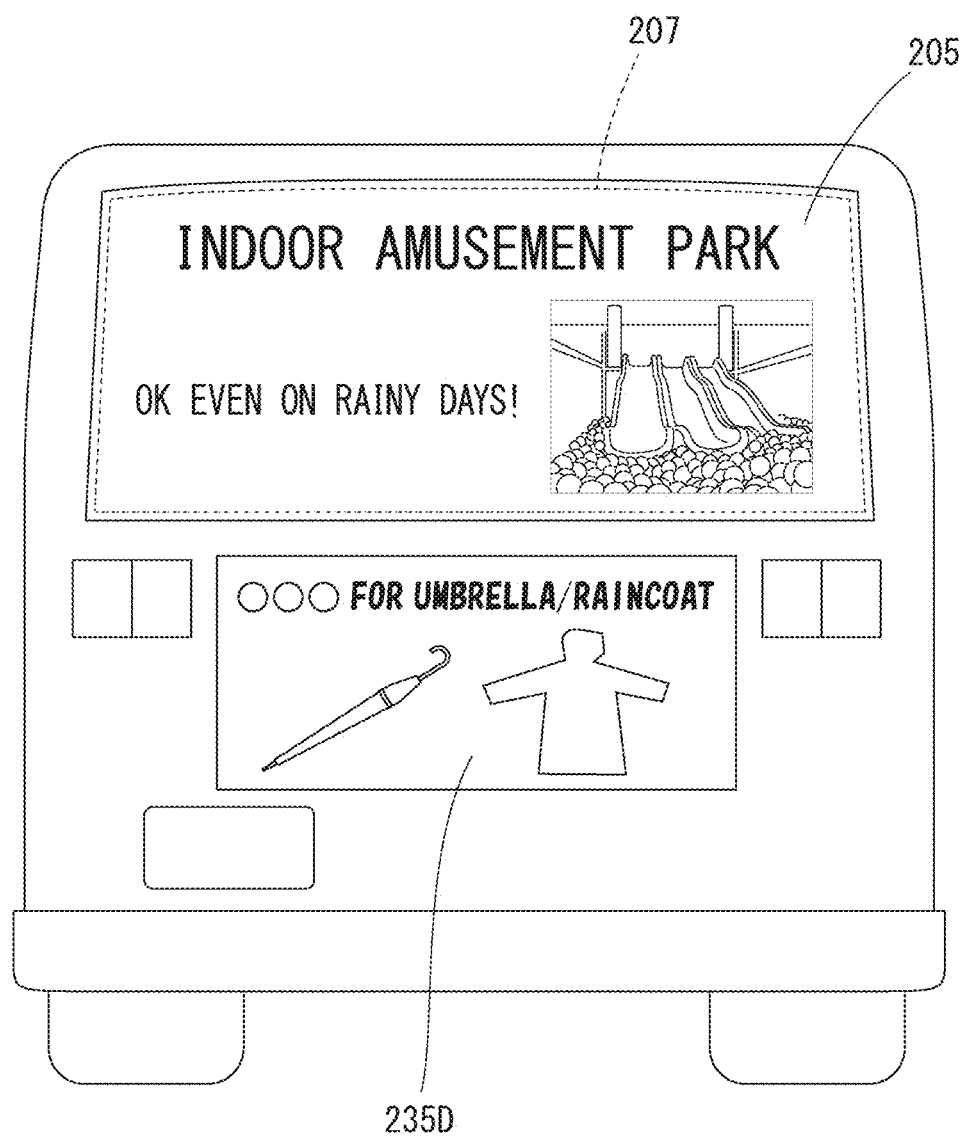
FIG. 26 is an explanatory view showing an example different from FIG. 24 of an advertisement display toward the outside of the vehicle 203.

The following example is also conceivable as another example of the selection in step S203. For example, when the weather of the current location of the vehicle 203 is rainy, the temperature outside the vehicle 203 (outside air temperature) is low (e.g., a equal to or lower than threshold temperature), the season is spring, the humidity outside the vehicle 203 is 50%, and the vehicle speed of the vehicle 203 is 30 km at the time point of step S203, if the distance from the position 1 to the current position of the vehicle 203 is within a certain distance, only the conditions associated with the advertisement image 1 are satisfied. In other words, only the advertisement image 1 corresponds to the "advertisement image in which the distance from the current position of the vehicle 203 to the position of the advertisement target is within a certain distance, and which meets all the conditions (all of environmental conditions, timing conditions, and traveling state associated with the advertisement image) at the time point of step S203". In such a case, the advertisement image 1 is selected in step S203, and the advertisement image 1 is displayed in step S204. The advertisement image 1 is an advertisement image suitable for rainy weather, and may be, for example, an "advertisement image of an indoor amusement park" as displayed on the window in FIG. 26, or an "advertisement image of ○○○ for selling umbrellas, raincoats, etc." as displayed on the display device 235D.

Furthermore, the following example is also conceivable as another example of the selection in step S203. For example, when the season is summer, the temperature outside the vehicle 203 (outside air temperature) is high (e.g., temperature exceeding a threshold temperature), the humidity outside the vehicle 203 is 90%, the vehicle speed of the vehicle 203 is 20 km, and the distance from each of the positions 2, 5, 6, and 7 to the current position of the vehicle 203 is within a certain distance for at the time point of step S203, the conditions associated with each of the advertisement images 2, 5, 6, and 7 are satisfied. In other words, all of the advertisement images 2, 5, 6, and 7 correspond to the "advertisement image in which the distance from the current position of the vehicle 203 to the position of the advertisement target is within a certain distance, and which meets all the conditions (all of environmental conditions, timing conditions, and traveling state associated with the advertisement image) at the time point of step S203". In such a case, among the advertisement images 2, 5, 6, and 7, the advertisement image in which the position of the advertisement target is the closest from the current position of the vehicle 203 may be displayed, or a predetermined number of advertisement images may be displayed in the order of closeness of the position of the advertisement target to the current position. In FIG. 27, three advertisement images (advertisement images 2, 5, and 7) are displayed in the order of closeness of the position of the advertisement target to the current position. The advertisement image 2 corresponding to the position that is the closest to the current position of the vehicle 203 among the positions 2, 5, 6, and 7 is, for example, an advertisement image of "○○ café" shown in FIG. 27, the advertisement image 5 corresponding to the position 5 that is the second closest to the current position of the vehicle 203 is, for example, an advertisement image of "○○ beer garden" shown in FIG. 27, and the advertisement image 7 corresponding to the position 7 that is the third closest to the current position of the vehicle 203 is, for example, an advertisement image of "○○ ranch" shown in FIG. 27.

In the present configuration, the control unit 213 corresponds to an example of a display control unit, and functions to select an advertisement image having a content corresponding to the target acquired by the information acquiring unit 211 from among a plurality of advertisement image candidates and cause the display unit 235 to display the advertisement image. Specifically, the control unit 213 (display control unit) causes the display unit 235 to display an advertisement image related to a location close to the position of the vehicle 203 (e.g., nearby store, facility etc.) from among a plurality of advertisement image candidates based on the position information acquired by the information acquiring unit 211 (information specifying the current position of the vehicle 203). Furthermore, when the environmental condition corresponds to a specific environmental condition (any of the predetermined environmental condition candidates), the control unit 213 (display control unit) selects an advertisement image having a content corresponding to the environmental information from a plurality of advertisement image candidates based on the "correspondence information in which the environmental condition and the advertising content are associated" and the "environmental information acquired by the information acquiring unit 211" and causes the display unit 235 to display the advertisement image (specifically, selects an advertisement image having a content corresponding to a combination of the position information and the environmental information acquired by the information acquiring unit 211 and causes the display unit 235 to display the advertisement image).

After controlling the display unit 235 to display the advertisement image in step S204 of FIG. 21, the control unit 213 determines whether or not the advertisement termination condition is established in step S205 while maintaining the state in which the advertisement image is displayed. When determining that the advertisement termination condition is established, the control unit 213 terminates the advertisement display control of FIG. 21. When not determining in step S205 that the advertisement termination condition is established, the control unit 213 determines in step S206 whether or not the advertisement update condition is established. When the advertisement update condition is not established, the control unit 213 returns to step S204 and continues to display the advertisement image, and when the advertisement update condition is established, the control unit 213 returns to step S202 and performs again the processes of step S202 and subsequent steps. The advertisement termination condition may be, for example, that a predetermined time has been reached, or that a predetermined operation has been performed on an operation unit (not shown), or that the vehicle 203 has stopped operating (e.g., a power source such as an engine has been stopped and the vehicle has been parked). Furthermore, the advertisement update condition may be, for example, that a certain time has elapsed from the start of the display of the advertisement image currently being displayed, or that the vehicle has left away by a certain distance or more from the point where the display of the advertisement image currently being displayed is started, or may be that a predetermined change has occurred in the weather or temperature (e.g., the temperature has changed by a certain value or more, the weather has changed from cloudy to rainy).

As described above, the vehicle advertisement display system 201 of the present disclosure acquires at least one of the position information of the vehicle, the information on the traveling state of the vehicle, and the environmental information of the inside or the outside of the vehicle as a target, select an advertisement image having a content corresponding to the acquired target, and displays the advertisement image. In other words, instead of displaying only a fixed advertisement determined in advance toward the inside or the outside of the vehicle, advertisement can be performed with the content corresponding to at least one of the actual position of the vehicle 203, the actual traveling state, and the actual environment of the inside or the outside of the vehicle 203. Therefore, advertisement suitable for the situation at the time of displaying the advertisement is easily performed, and advertisement that meets the interests and needs of the viewer of the advertisement is easily performed.

In the system 201, the display unit 235 displays the advertisement image at least toward the outside of the vehicle 203. With this configuration, an advertisement having the content corresponding to at least one of the actual position of the vehicle 203, the actual traveling state, and the actual environment of the inside or the outside of the vehicle can be displayed toward the outside of the vehicle 203. Therefore, advertisement that meets the interests and needs of the person who sees the advertisement outside the vehicle 203 is easily performed.

Furthermore, in the system 201, the information acquiring unit 211 acquires at least the position information, and the display control unit causes the display unit 235 to display an advertisement image related to a location close to the position of the vehicle 203 from among a plurality of advertisement image candidates based on the position information acquired by the information acquiring unit 211. With this configuration, an advertisement related to a location close to the current position of the vehicle 203 can be displayed, so that a viewer of the advertisement may easily go to the location related to the advertisement. Thus, the advertisement effect can be further enhanced.

Moreover, in the system 201, the information acquiring unit 211 acquires at least one of weather, temperature, and humidity, as environmental information. Then, the display control unit selects an advertisement image having a content corresponding to the environmental information from a plurality of advertisement image candidates based on the correspondence information in which the environmental conditions and the advertising content are associated with each other and the environmental information acquired by the information acquiring unit 211, and causes the display unit 235 to display the advertisement image. With this configuration, an advertisement corresponding to the current environment of the vehicle 203 (particularly, weather, temperature, humidity) can be displayed, so that advertisement suitable for the environment when displaying the advertisement is easily performed. Thus, advertisement that meets the interests and needs of the viewer of the advertisement can be easily performed.

Specifically, the information acquiring unit 211 acquires both the position information and the environmental information, and the display control unit selects an advertisement image having a content corresponding to the combination of the position information and the environmental information acquired by the information acquiring unit 211, and causes the display unit 235 to display the advertisement image. With this configuration, an advertisement corresponding to both of the current position and the environment of the vehicle 203 can be displayed, so that advertisement that further meets the interests and needs of the viewer of the advertisement can be easily performed.

The system 201 includes the light-adjusting member 207 arranged in the incident portion 205 which the external light enters, and the light-adjusting control unit that switches the light-adjusting member 207 between the state of first transmittance and the state of second transmittance smaller than the first transmittance. The light-adjusting control unit switches the light-adjusting member 207 to the state of second transmittance when a predetermined condition is established, and the display control unit displays the advertisement image on the light-adjusting member 207 when the light-adjusting member 207 has been switched to the state of the second transmittance. With this configuration, the position where the light-adjusting member 207 is arranged can be effectively used as the advertisement position.

The examples described above or below are merely for illustrative purposes only and are not to be construed as limiting the present disclosure. Although the present disclosure has been described with reference to exemplary embodiments, it is to be understood that the language used in the description and the illustration of the present disclosure is descriptive and illustrative and not restrictive. As set forth herein, modifications may be made within the scope of the appended Claims without deviating from the scope or essence of the present disclosure in its form. Although reference has been made herein to specific structures, materials and examples in the detailed description of the present disclosure, it is not intended to limit the present disclosure to the disclosed matters herein, but rather the present disclosure is to cover all functionally equivalent structures, methods, and uses within the scope of the appended Claims.

The second disclosure is not limited to the embodiment described in detail above, and various modifications or changes can be made within the scope defined in the Claims.

(1) in the embodiment described above, a bus is shown as an example of a vehicle, but vehicles other than the bus may be used, or other carriages may be used.

(2) In the embodiment described above, an example in which an advertisement directed toward the outside of the vehicle 203 is performed has been described, but a similar advertisement may be performed in the interior of the vehicle 203. For example, instead of displaying the reversed image of the advertisement image selected in step S203 by the method described above on the window as shown in FIG.

5, a not reversed image of the advertisement image may be displayed to show the advertisement image to the occupant inside. Alternatively, the advertisement image selected in step S203 by the method described above may be displayed on a display device (liquid crystal display device etc.) provided inside the vehicle 203 to be shown to the occupant.

(3) The advertisement image may be selected based on the current position of the vehicle 203 and the traveling state condition (e.g., condition of the vehicle speed of the vehicle 203). For example, when only the position 8 among the plurality of advertisement target positions is within a certain distance from the current position of the vehicle 203 at the time point of step S203, and the vehicle speed of the vehicle 203 continues for a certain period of time or longer at a predetermined speed per hour (e.g., 60 km per hour) or more, the advertisement image 8 corresponding to these conditions may be displayed toward the outside of the vehicle 203. When the vehicle speed of the vehicle 203 is relatively high and continues for a certain period of time or longer, the vehicle is very likely running on a highway. Therefore, in such a case, as the advertisement image 8, the advertisement information of the service area of the highway closest to the current position of the vehicle 203 may be displayed, and the advertisement information of the store near the interchange closest to the current position may be displayed.

(4) In the embodiment described above, the condition that the speed per hour of the vehicle 203 is in a predetermined range is exemplified as the traveling state condition, but it is not limited to such a condition. For example, the traveling state condition may be a condition that the rotation speed of the vehicle 203 is a predetermined range, or a condition that a predetermined device in the vehicle 203 (e.g., a wiper, a headlight etc.) is used for a certain period of time or more.

(5) In the embodiment described above, as the timing condition, conditions such as spring, summer, autumn and winter, and a predetermined months have been exemplified, but the timing condition may be a predetermined day of the week, a predetermined time, or a predetermined time slot. In this case, the advertisement image can be displayed in accordance with a predetermined day of the week, a predetermined time, and a predetermined range of time.

What is claimed is:

1. A vehicle advertisement display system to be mounted on a vehicle, the vehicle advertisement display system comprising:
    a display device;
    an information acquiring unit, including a processor, configured to acquire at least one of position information of the vehicle, information of a traveling state of the vehicle, and environmental information inside or outside of the vehicle;
    a control unit, including a processor, that selects an advertisement image having a content corresponding to the acquired at least one of position information of the vehicle, information of a traveling state of the vehicle and environmental information inside or outside of the vehicle, from among a plurality of advertisement image candidates;
    a light-adjusting member that includes a first electrode and a second electrode and is provided at an incident portion where an external light enters, wherein transmittance of the light-adjusting member changes such that the light-adjusting member becomes transparent or high transmittance when a voltage is applied between the first electrode and the second electrode, and the light-adjusting member becomes opaque or low transmittance when no voltage is applied between the first electrode and the second electrode;
    the control unit determines a predetermined condition has been established and the advertisement image has been selected based on the acquired at least one of position information of the vehicle, information of a traveling state of the vehicle, and environmental information inside or outside of the vehicle;
    in response to determining the predetermined condition, the control unit switches the light-adjusting member from a state of first transmittance to a state of second transmittance, by adjusting the voltage between the first electrode and the second electrode, the state of first transmittance being transparent or high transmittance of light and the state of second transmittance being opaque or low transmittance of light; and
    the control unit causes the display device to display the selected advertisement image on the light-adjusting member according to the state of the second transmittance, wherein the state of second transmittance stops an application of the voltage between the first and second electrodes.

2. The vehicle advertisement display system according to claim 1, wherein the display device displays the advertisement image at least toward an outer side of the vehicle.

3. The vehicle advertisement display system according to claim 1, wherein
    the information acquiring unit acquires at least the position information; and
    the control unit causes the display device to display an advertisement image related to a location close to the position of the vehicle from among a plurality of advertisement image candidates based on the position information acquired by the information acquiring unit.

4. The vehicle advertisement display system according to claim 1, wherein the information acquiring unit acquires at least one of weather, temperature, and humidity, as the environmental information; and
    the control unit selects an advertisement image having a content corresponding to the environmental information from a plurality of advertisement image candidates based on correspondence information in which environmental conditions and advertising contents are associated with each other and the environmental information acquired by the information acquiring unit.

5. The vehicle advertisement display system according to claim 1, wherein the information acquiring unit acquires both the position information and the environmental information; and
    the control unit selects the advertisement image having a content corresponding to a combination of the position information and the environmental information acquired by the information acquiring unit.

6. The vehicle advertisement display system according to claim 1, wherein
    the display device includes a projector, and
    the control unit causes the projector to display the selected advertisement image in an area where the light-adjusting member, which has been switched to the state of the second transmittance, is arranged.

7. The vehicle advertisement display system according to claim 6, wherein
    the projector is disposed inside the vehicle, and
    the control unit causes the projector to display a reversed image of the advertisement image on a surface on an interior side of the vehicle in the incident portion in a state in which the light-adjusting member has been switched to the state of the second transmittance.

* * * * *